US010766362B2

United States Patent
Pritchard et al.

(10) Patent No.: US 10,766,362 B2
(45) Date of Patent: Sep. 8, 2020

(54) LOCKING TRANSFER CASE

(71) Applicant: BorgWarner Inc., Auburn Hills, MI (US)

(72) Inventors: Larry A. Pritchard, Macomb, MI (US); Thaddeus R. Kopp, Jr., Oakland Township, MI (US); Branden L. Reeves, Oxford, MI (US); Philip J. Francis, Lapeer, MI (US); Joseph D. Mastie, Belleville, MI (US)

(73) Assignee: BorgWarner Inc., Auburn Hills, MI (US)

( * ) Notice: Subject to any disclaimer, the term of this patent is extended or adjusted under 35 U.S.C. 154(b) by 701 days.

(21) Appl. No.: 15/438,818

(22) Filed: Feb. 22, 2017

(65) Prior Publication Data
US 2017/0240043 A1    Aug. 24, 2017

Related U.S. Application Data

(60) Provisional application No. 62/298,420, filed on Feb. 22, 2016.

(51) Int. Cl.
*B60K 17/344* (2006.01)
*F16H 37/06* (2006.01)
(Continued)

(52) U.S. Cl.
CPC ........ *B60K 17/344* (2013.01); *B60K 17/3467* (2013.01); *B60K 23/08* (2013.01);
(Continued)

(58) Field of Classification Search
CPC ...... B60K 17/344; F16H 37/065; F16D 13/52
(Continued)

(56) References Cited

U.S. PATENT DOCUMENTS

| 7,992,668 B2 * | 8/2011 | Smith | F16D 3/185 |
| | | | 180/233 |
| 8,235,860 B2 * | 8/2012 | Williams | B60K 17/344 |
| | | | 475/299 |

(Continued)

FOREIGN PATENT DOCUMENTS

| DE | 10304730 B3 | 10/2004 |
| DE | 102008037885 A1 | 3/2010 |
| WO | 2012177504 A1 | 12/2012 |

*Primary Examiner* — Ha Dinh Ho
(74) *Attorney, Agent, or Firm* — Young Basile Hanlon & MacFarlane, P.C.

(57) ABSTRACT

A transfer case comprises a primary output shaft, and a secondary output shaft selectively coupleable to the primary output shaft with a plate clutch to transfer torque therebetween. The plate clutch includes a housing, a plurality of interleaved plates that are engaged alternatingly with the primary output shaft and the housing to rotate therewith, and an apply plate non-selectively coupled to the primary output shaft to rotate therewith. The apply plate is moveable axially along the primary output shaft into a first configuration in which the apply plate is positively coupled to the housing to rotate therewith, a second configuration in which the apply plate rotates independent of the housing, and a third configuration in which the apply plate compresses the interleaved plates to form a friction coupling between the primary output shaft and the housing.

19 Claims, 12 Drawing Sheets

(51) Int. Cl.
*F16D 13/52* (2006.01)
*F16D 28/00* (2006.01)
*F16D 11/14* (2006.01)
*F16D 23/12* (2006.01)
*F16D 47/00* (2006.01)
*B60K 17/346* (2006.01)
*B60K 23/08* (2006.01)
*B60K 5/02* (2006.01)

(52) U.S. Cl.
CPC .............. *F16D 11/14* (2013.01); *F16D 23/12* (2013.01); *F16D 28/00* (2013.01); *F16D 47/00* (2013.01); *F16H 37/065* (2013.01); *B60K 5/02* (2013.01); *B60K 2023/0825* (2013.01); *B60Y 2400/405* (2013.01); *B60Y 2400/424* (2013.01); *F16D 13/52* (2013.01); *F16D 2023/123* (2013.01); *F16H 2200/0034* (2013.01)

(58) Field of Classification Search
USPC ....................................................... 74/665 F
See application file for complete search history.

(56) References Cited

U.S. PATENT DOCUMENTS

| | | |
|---|---|---|
| 9,186,987 B2 | 11/2015 | Mastie et al. |
| 9,447,873 B2 | 9/2016 | Pritchard |
| 2006/0281597 A1* | 12/2006 | Williams ............. B60K 17/344 475/198 |

* cited by examiner

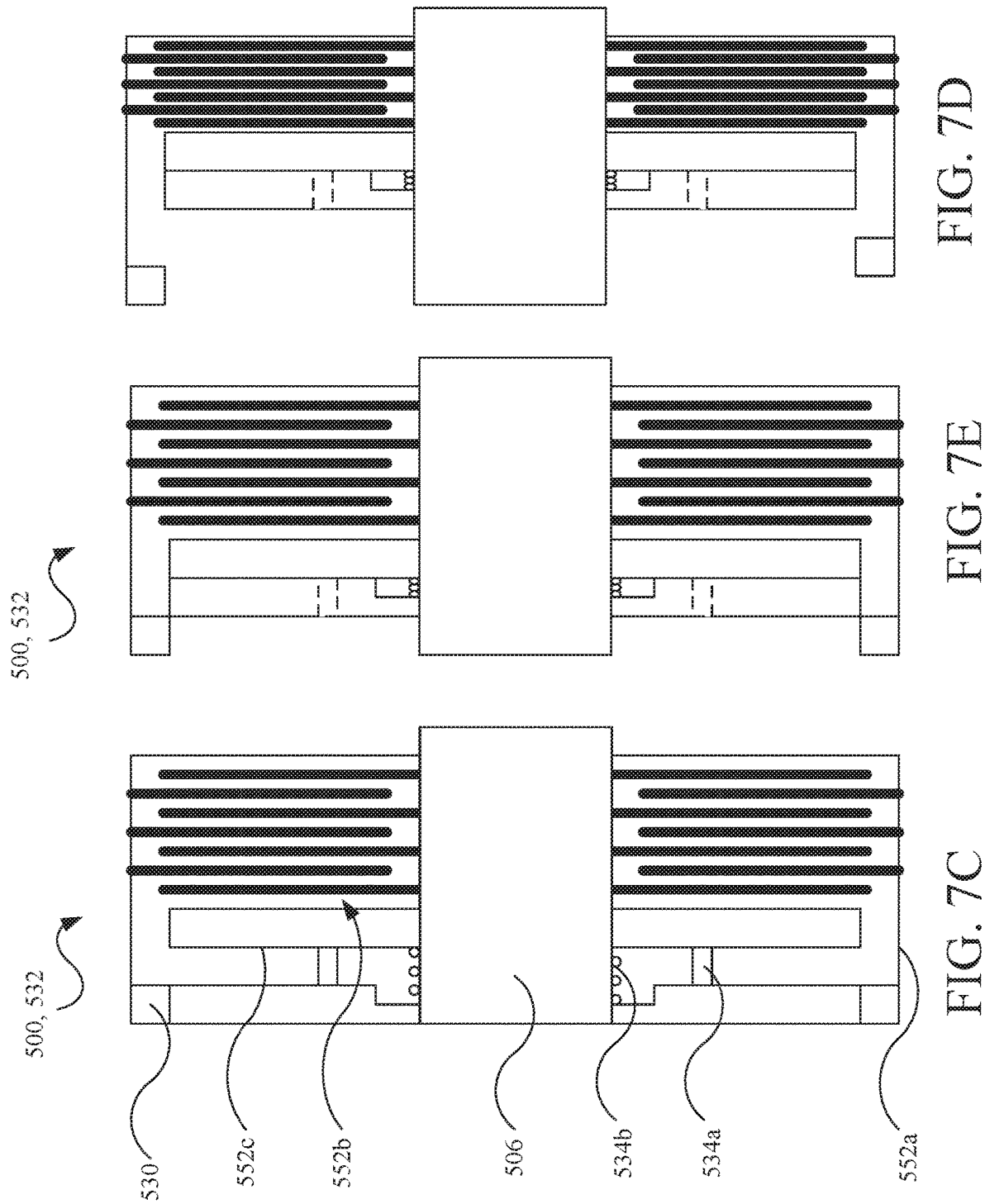

LOCKING TRANSFER CASE

CROSS-REFERENCE TO RELATED APPLICATIONS

This application claims priority to and the benefit of U.S. Provisional Application No. 62/298,420, filed Feb. 22, 2016, the entire disclosure of which is hereby incorporated by reference.

BACKGROUND

In the field of vehicle drivetrain components, a transfer case is an apparatus that distributes driving power to more than one driven axle of the vehicle. A typical transfer case receives driving power from the transmission of the vehicle and transfers that power to a primary output shaft that is driven constantly, for example, during operation of the vehicle in a two-wheel drive mode, and a secondary output shaft that is driven selectively using a clutch, for example, during operation of the vehicle in a four-wheel drive mode. In addition, two-speed transfer cases provide gear reduction to allow operation in a high range, which is typically a 1:1 drive ratio, or a low range, such as a 2:1 drive ratio.

It would be advantageous to provide a transfer case that additionally positively couples the primary output shaft to the secondary output shaft for transferring torque therebetween.

SUMMARY

A transfer case comprises a primary output shaft, and a secondary output shaft selectively coupleable to the primary output shaft with a plate clutch to transfer torque from the primary output shaft to the secondary output shaft. The plate clutch includes a housing, a plurality of interleaved plates that are engaged alternatingly with the primary output shaft and the housing to rotate therewith, and an apply plate non-selectively coupled to the primary output shaft to rotate therewith. The apply plate is moveable axially along the primary output shaft into a first configuration in which the apply plate is positively coupled to the housing to rotate therewith, a second configuration in which the apply plate rotates independent of the housing, and a third configuration in which the apply plate compresses the interleaved plates to form a friction coupling between the primary output shaft and the housing. The secondary torque transfer mechanism may include a locking ring fixedly coupled within a forward end of the housing, and in the first position, the apply plate forms a splined coupling with the locking ring. Alternatively, an annular member is coupled to the apply plate to rotate therewith and move axially relative thereto, and in the first configuration, the annular member forms a splined coupling with the locking ring.

In another implementation, a transfer case includes a primary output shaft, a secondary output shaft, and a clutch for selectively transferring torque between the primary output shaft and the secondary output shaft. The clutch includes an apply plate, a housing, and interleaved plates. The apply plate is coupled to the primary output shaft to rotate therewith. The housing is coupled to the secondary shaft to rotate therewith. The interleaved plates are alternatingly coupled to the primary shaft of the housing to rotate therewith. The apply plate selectively positively couples to the housing to form a positive coupling between the primary output shaft and the secondary output shaft to transfer torque therebetween. The apply plate also selectively compresses the interleaved plates to form a friction coupling between the primary output shaft and the secondary output shaft to transfer torque therebetween.

The transfer case may further include an actuation system having different stages of rotation to form the positive coupling and to form the friction coupling. The positive coupling may be formed with the apply plate in a first configuration, while the friction coupling may be formed with the apply plate in a second configuration, and the positive coupling and the friction coupling may not be formed when the apply plate is in a third configuration. The housing may include a collar coupled thereto, while the apply plate selectively positively couples to the collar to form the positive coupling in the first configuration. The housing may be annular with an inner housing periphery, while the collar protrudes radially inward from the inner housing periphery of the housing. The apply plate may selectively form a splined connection with the collar to positively couple the apply plate to the collar. The collar may have an inner periphery, while the apply plate may have an outer periphery that is complementary to the inner collar periphery to selectively form the splined connection.

In another implementation, a clutch is provided for selectively transferring torque between a primary shaft and a secondary shaft of a transfer case. The clutch includes an apply plate, a housing, and interleaved plates. The apply plate is selectively coupleable to the housing to positively couple the primary shaft to the secondary shaft to transfer torque therebetween, and selectively compresses the interleaved plates to frictionally couple the primary shaft to the secondary shaft. The housing may include a collar that is selectively engageable by the apply plate to positively couple the apply plate to the housing.

In another implementation, a transfer case includes a primary shaft, a secondary shaft, and a clutch for transferring torque between the primary shaft and the secondary shaft by forming a positive coupling therebetween and a friction coupling therebetween. The clutch includes an apply plate, a housing, and interleaved plates. The apply plate positively couples to the housing to form the positive coupling and compresses the interleaved plates to form the friction coupling.

BRIEF DESCRIPTION OF THE DRAWINGS

The description herein makes reference to the accompanying drawings, wherein like referenced numerals refer to like parts throughout several views.

FIG. 7C is a cross-sectional schematic view of a portion of the transfer case of FIG. 7A in the first configuration.

FIG. 7D is a cross-sectional schematic view of the portion of the transfer case shown in FIG. 7C in the second configuration.

FIG. 7E is a cross-sectional schematic view of the portion of the transfer case shown in FIG. 7C in a third configuration.

DETAILED DESCRIPTION

Figure 1:
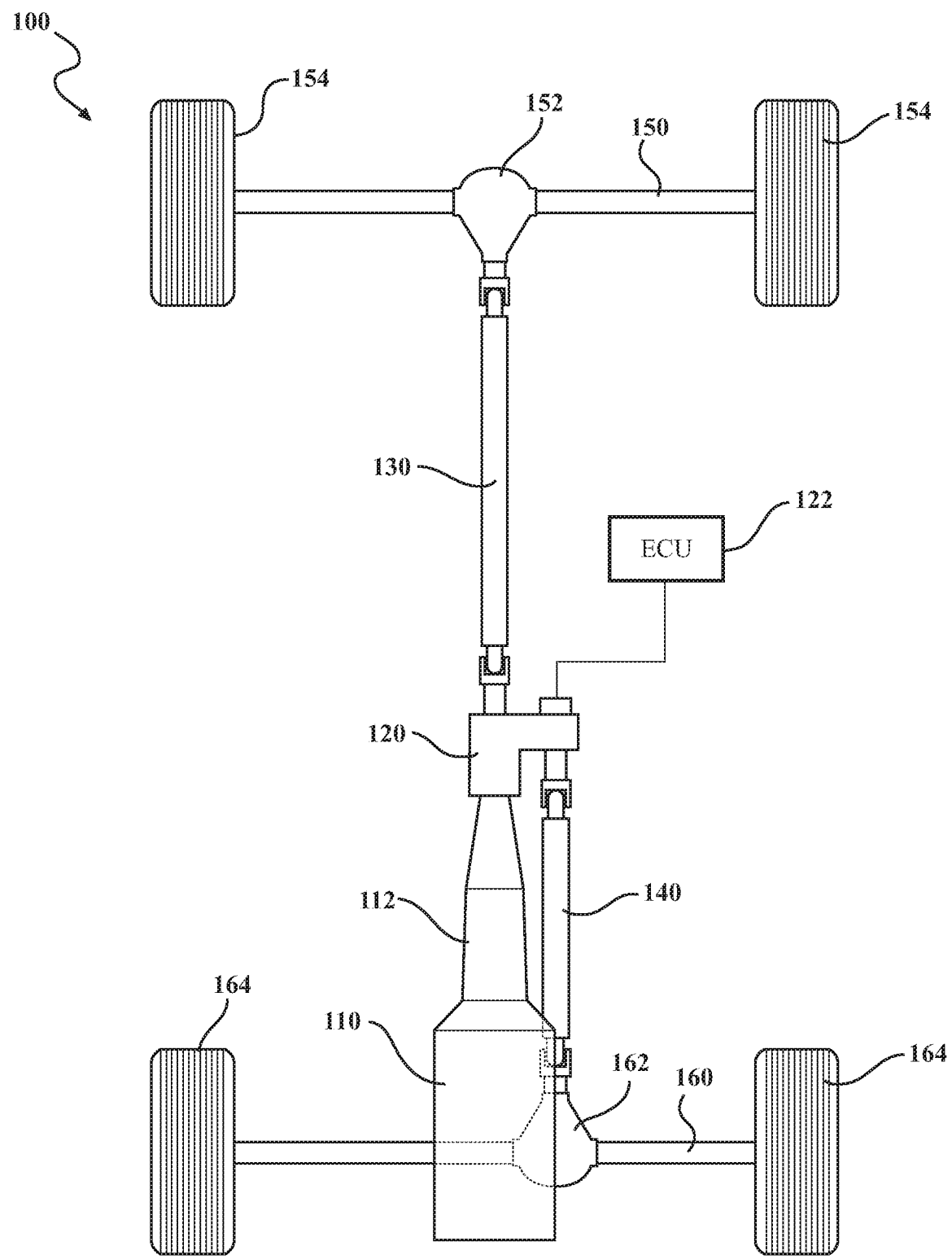
FIG. 1 is a plan view illustration showing a drivetrain that includes a transfer case.

FIG. 1 is a plan view illustration showing a drivetrain 100 for a four-wheel drive vehicle. The drivetrain 100 includes an engine 110 that is coupled to a transmission 112. The engine 110 is the prime mover of the drivetrain 100 and can be, for example, an internal combustion engine, an electric motor/generator, or a combination of the two. Other types of prime movers can be utilized as the engine 110 to provide driving power (e.g. via a rotating output shaft) to the transmission 112. The transmission 112 includes components operable to convert the speed and torque of the driving power provided by the engine 110, such as by a gear train that provides multiple gear ratios. As examples, the transmission 112 can be a manual transmission, an automatic transmission, a semi-automatic transmission, a continuously variable transmission, or a dual clutch transmission.

The transmission 112 provides driving power to a transfer case 120. The transfer case 120 is operable to distribute driving power to a rear driveshaft 130 and a front driveshaft 140. The transfer case 120 can, in some implementations, include components that allow the transfer case 120 to perform a mode shift between two or more different modes. For example, the transfer case 120 can allow operation in a rear-wheel drive or two-wheel drive mode, in which only the rear driveshaft 130 receives driving power and the front driveshaft 140 does not, and a four-wheel drive mode, in which the rear driveshaft 130 and the front driveshaft 140 both receive driving power. In this example, the rear driveshaft 130 is the primary driveshaft, and the front driveshaft 140 is the secondary driveshaft. In other implementations, the front driveshaft 140 is the primary driveshaft, and the rear driveshaft 130 is the secondary driveshaft, wherein the transfer case 120 performs a mode shift between a front-wheel drive mode and a four-wheel drive mode. In other implementations, the transfer case 120 does not include components that allow a mode shift, and the transfer case 120 constantly provides driving power to both the rear driveshaft 130 and the front driveshaft 140.

The transfer case 120 can allow a range shift that selectively provides gear reduction to the rotational output of the transfer case 120. For example, the transfer case 120 can include components for operating in a high range, such as a 1:1 drive ratio, or a low range, such as a 2:1 drive ratio. The range shift changes the transfer case 120 between operation in the low range and the high range by selectively coupling and uncoupling a gear reduction mechanism of the transfer case 120.

Operation of the transfer case 120 can be regulated by a controller such as an ECU 122 that provides signals to components of the transfer case 120 to cause the mode shift and/or the range shift. In other implementations, the mode shift and/or the range shift can be actuated mechanically, such as by a driver-operated lever that is mechanically connected to a component of the transfer case 120.

The rear driveshaft 130 provides driving power to a rear axle 150 via a rear differential 152. The rear axle 150 can be, for example, a solid axle or a pair of independent half axles. The rear axle 150 provides driving power to a pair of rear wheels 154 that are fitted with tires. The front driveshaft 140 provides driving power to a front axle 160 via a front differential 162. The front axle 160 can also be, for example, a solid axle or a pair of independent half axles. The front axle 160 provides driving power to a pair of front wheels 164 that are fitted with tires.

Figure 2:
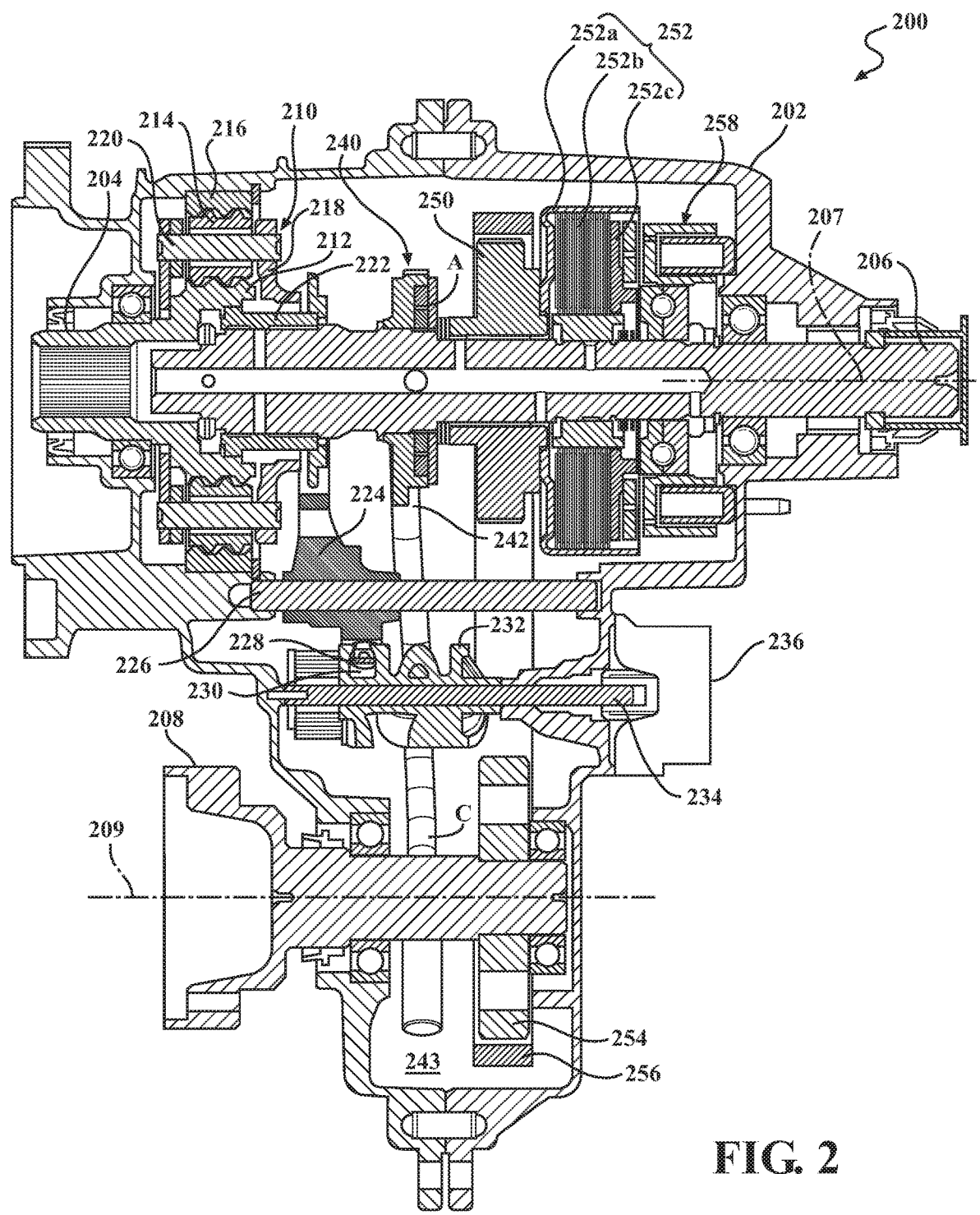
FIG. 2 is a cross-section illustration showing a transfer case having a conventional actuation system.

As shown in FIG. 2, the transfer case 200 generally includes a gear reduction system or mechanism 210 and a secondary torque transfer system or mechanism. The gear reduction system 210 is configured to transfer torque selectively at different drive ratios from an input shaft 204 to a primary output shaft 206 and is operable by a reduction actuation mechanism. The secondary torque transfer system is configured to selectively transfer torque between the primary output shaft 206 (e.g., the rear output shaft or driveshaft 130) and a secondary output shaft 208 (e.g., the front output shaft or driveshaft 140), and is operable by a torque transfer actuation mechanism. In the discussion that follows, directional terminology (e.g., front, forward, back, rearward, etc.), though referring to an orientation in which the transfer case 200 might may be installed in a vehicle (e.g., in the cross-sections shown in FIGS. 2 and 3, the left side is the front of the transfer case 200, while the right side is the rear of the transfer case 200), such directional terminology is for reference only, as other mounting orientations of the transfer case 200 and other transfer cases discussed below are possible.

The transfer case 200 includes a housing 202 and rotating components including the input shaft 204, the primary output shaft 206, and the secondary output shaft 208 that each extend out of the housing 202. The input shaft 204 and the primary output shaft 206 extend along a first axis 207. The secondary output shaft 208 extends along a second axis 209 which is, in this example, parallel to the first axis 207. Together, the input shaft 204, the primary output shaft 206, and the secondary output shaft 208 form a power transfer assembly.

The input shaft 204 is at least partially hollow, and the primary output shaft 206 extends into the hollow interior of the input shaft 204. The input shaft 204 can be connected to the primary output shaft 206 either directly or via a gear reduction mechanism 210. The gear reduction mechanism 210 can be a Ravigneaux planetary gearset that includes a sun gear 212 formed on the input shaft 204, a plurality of planet gears 214, and a ring gear 216 that is fixed to the housing 202. A planet carrier 218 is arranged on the input shaft 204 and can rotate about the input shaft 204. The planet gears 214 are arranged on stub shafts 220 that are connected to the planet carrier 218. The planet gears 214 mesh with the sun gear 212 and the ring gear 216.

A dog clutch mechanism having a gear reduction hub 222 (e.g., dog clutch, coupling, ring) is utilized to engage and disengage the gear reduction mechanism 210. In a first position, the gear reduction hub 222 is positioned axially forward (i.e., parallel with the primary output shaft 206) to engage the input shaft 204 and the primary output shaft 206 directly, which establishes a 1:1 drive ratio and does not utilize the gear reduction mechanism 210. In a second position of the gear reduction hub 222 (not shown), the gear reduction hub 222 is shifted axially rearward away from the input shaft 204, and instead engages the planet carrier 218 and the primary output shaft 206. Driving power is thus routed through the gear reduction mechanism 210, with the planet carrier 218 rotating slower than the input shaft 204 to establish a drive ratio such as 2:1.

The reduction actuation mechanism moves the gear reduction hub 222 between its first and second positions. In particular, the gear reduction hub 222 is moved by a first selector fork 224 which moves forward and rearward axially along a selector shaft 226. A first cam follower 228 is formed on the first selector fork 224. The first cam follower 228 is disposed in a first groove 230 formed on an exterior surface of a barrel cam 232. The barrel cam 232 is disposed on a rotatable shaft 234 that is rotated by an electric motor 236 in response to control signals from a controller such as the ECU 122 of FIG. 1.

The secondary torque transfer mechanism is configured to transfer torque from the primary output shaft 206 to the secondary output shaft 208. A first sprocket 250 (e.g., rotating member) is arranged on the primary output shaft 206 and connected to the primary output shaft 206 by a plate clutch 252. The second sprocket 254 is arranged on the secondary output shaft 208 and is connected thereto for rotation in unison, such as by splines (not shown). The first sprocket 250 and the second sprocket 254 are connected by a chain 256, such that the secondary output shaft 208 is driven by the primary output shaft 206 via the first sprocket 250, the chain 256, and the second sprocket 254 when the clutch 252 is engaged.

The plate clutch 252 generally includes a housing 252a (e.g., drum), a plurality of interleaved plates 252b, a pressure or apply plate 252c, and an actuator 258. The housing 252a generally includes a radial base through which the primary output shaft 206 extends, and a concentric or annular flange extending axially away from an outer periphery of the base to form the housing 252a, which is generally cylindrical and in which the interleaved plates 252b are positioned. The base of the housing 252a is fixedly coupled to the first sprocket 250 to cause rotation thereof, while the apply plate 252c is coupled to the primary output shaft 206 (e.g., through a splined connection) to rotate therewith and slide therealong. The interleaved plates 252b alternate between being engaged (e.g., splined) with the primary output shaft 206 and an inner periphery of the housing 252a. The actuator 258 is configured to press on the apply plate 252c, so as to compress the interleaved plates 252b between the apply plate 252c and the base of the housing 252a, so as to increase friction therebetween and transfer torque between the interleaved plates 252b splined with primary output shaft 206 and the interleaved plates 252b splined with the housing 252a. In this manner, torque may be selectively transferred from the primary output shaft 206 to the first sprocket 250 and ultimately the secondary output shaft 208.

Figure 3:
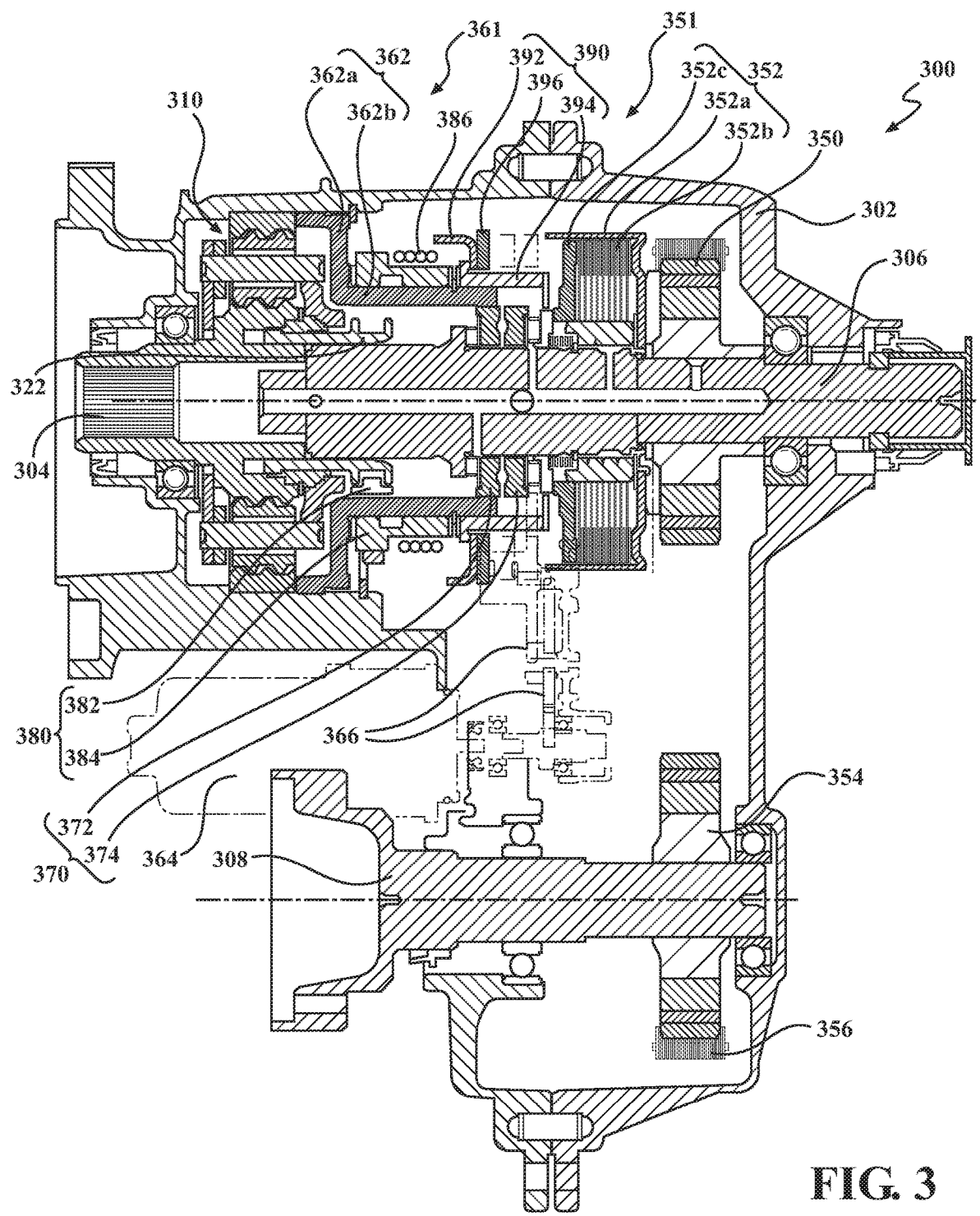
FIG. 3 is a cross-section illustration showing a transfer case having an actuation system according to an exemplary embodiment.
Figure 4:
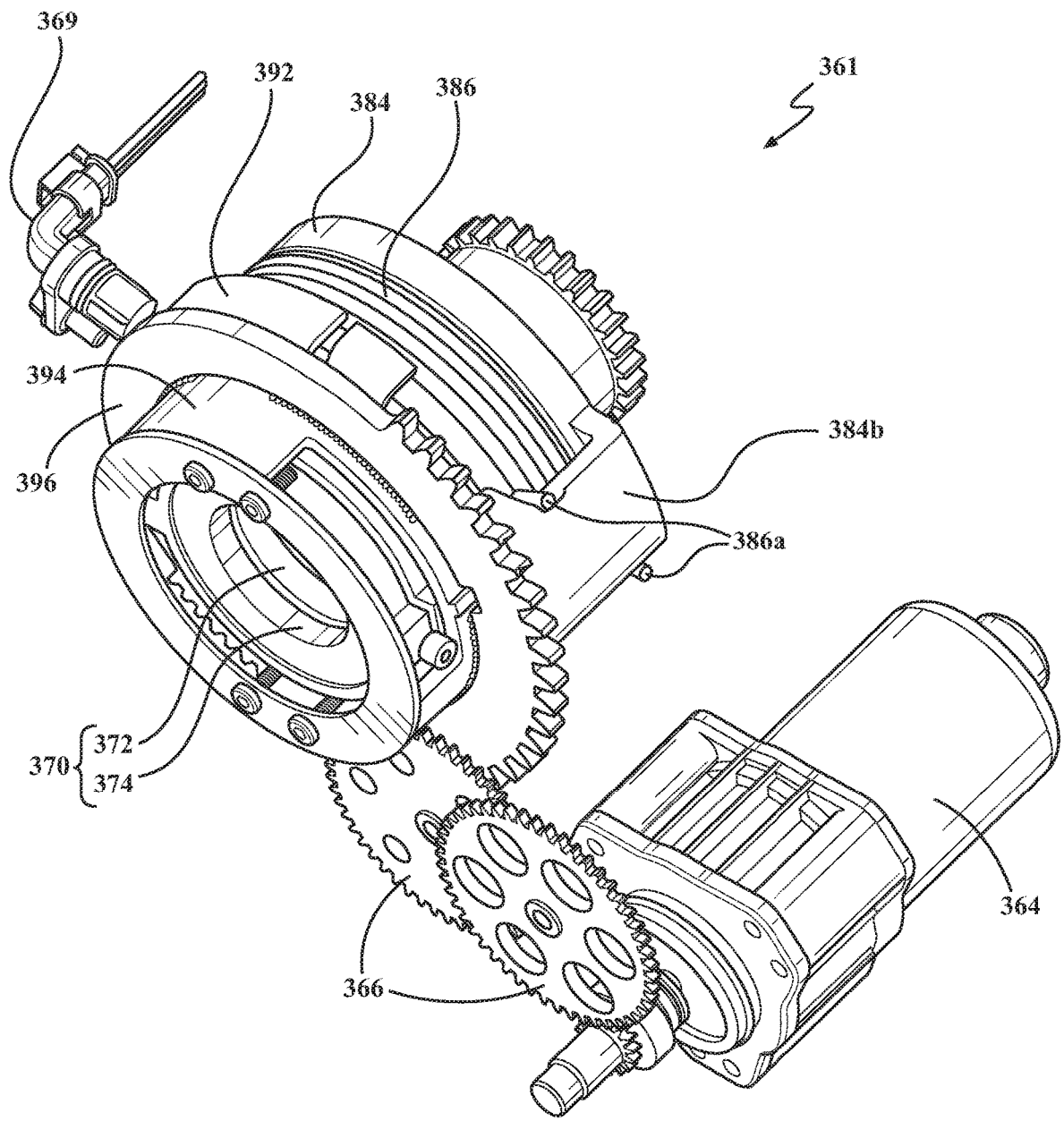
FIG. 4 is a rear perspective view of the actuation system.
Figure 5:
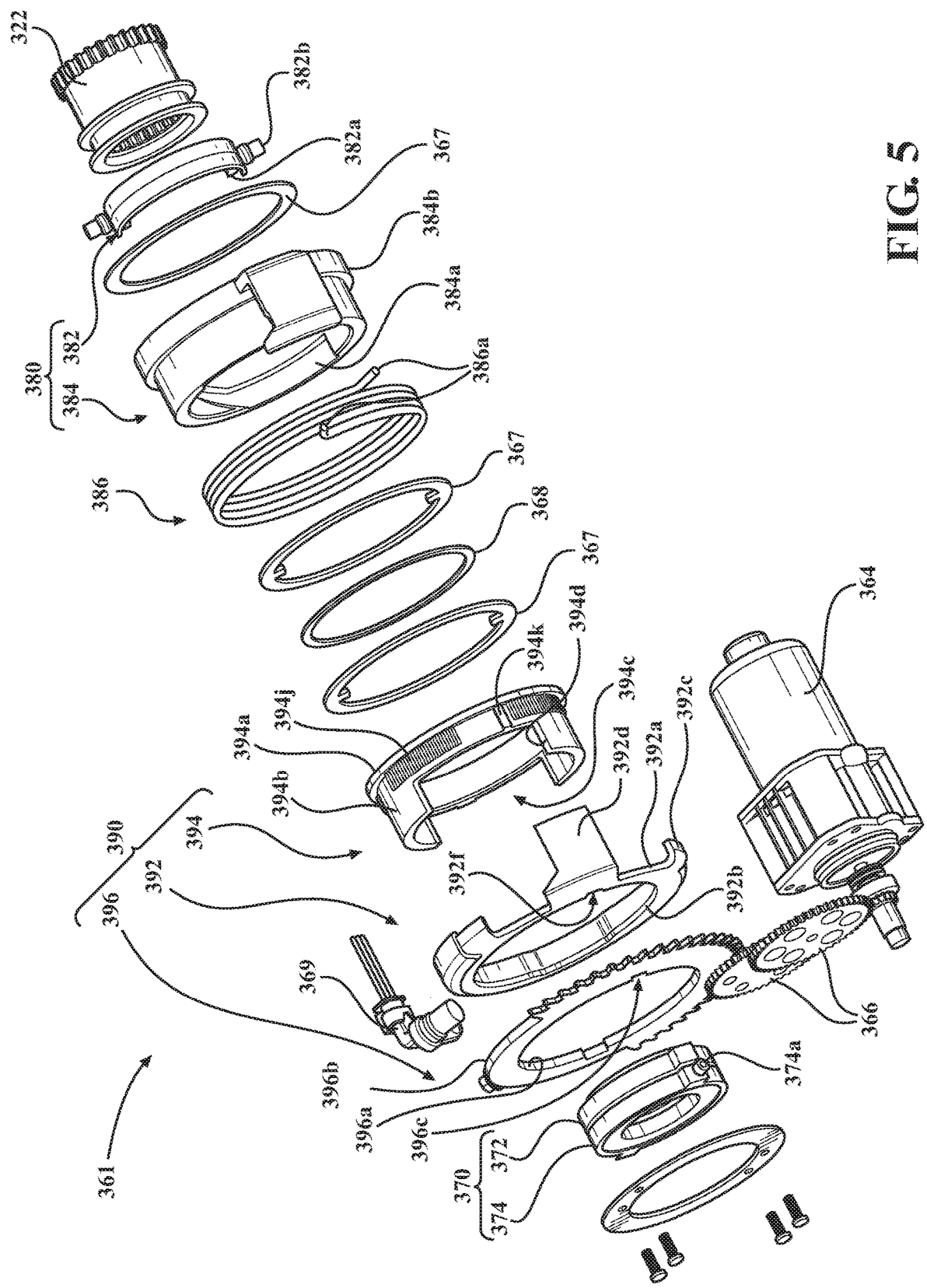
FIG. 5 is an exploded view of the actuation system.
Figure 6A:
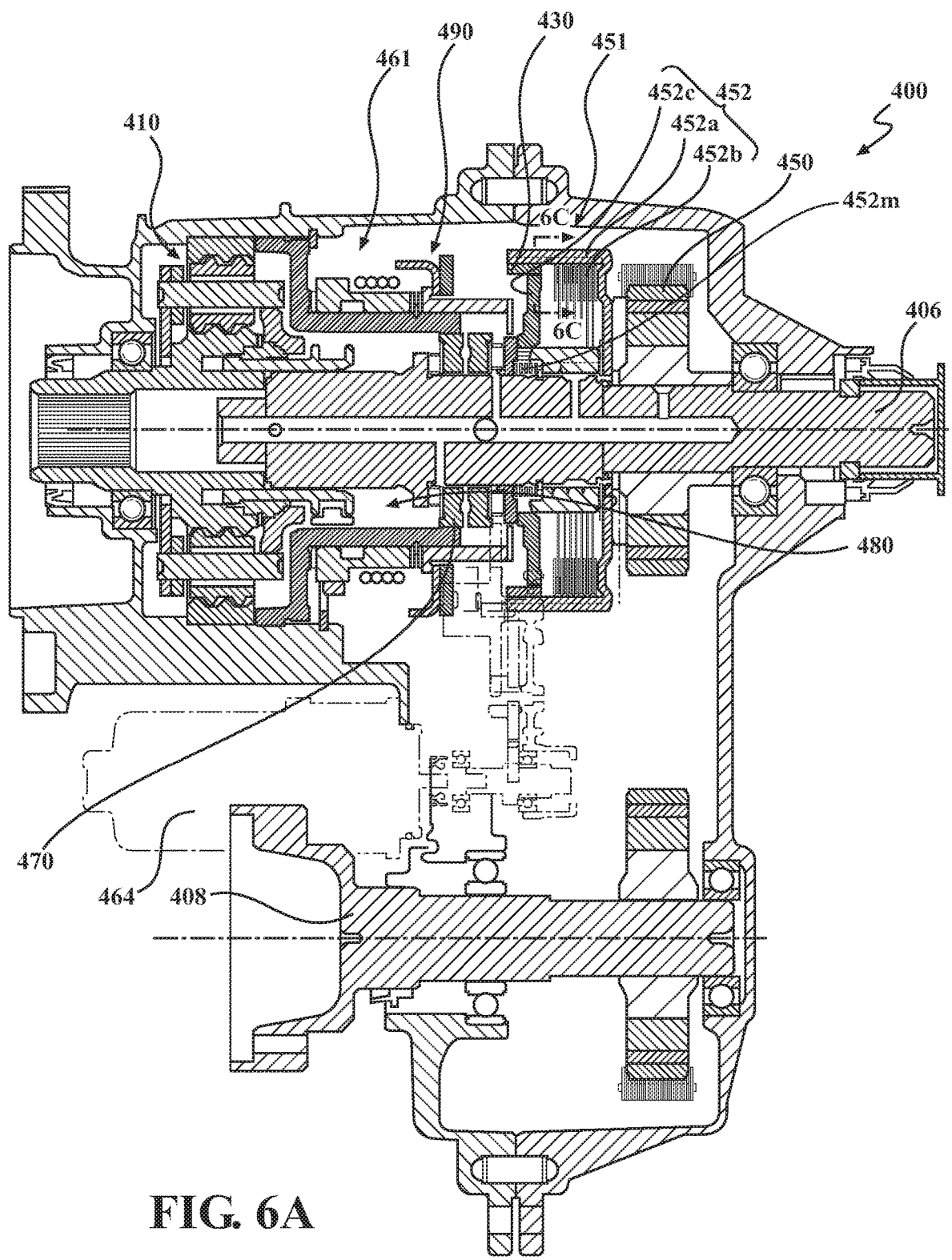
FIG. 6A is a cross-sectional view of a transfer case in a first configuration according to another exemplary embodiment.
Figure 6B:
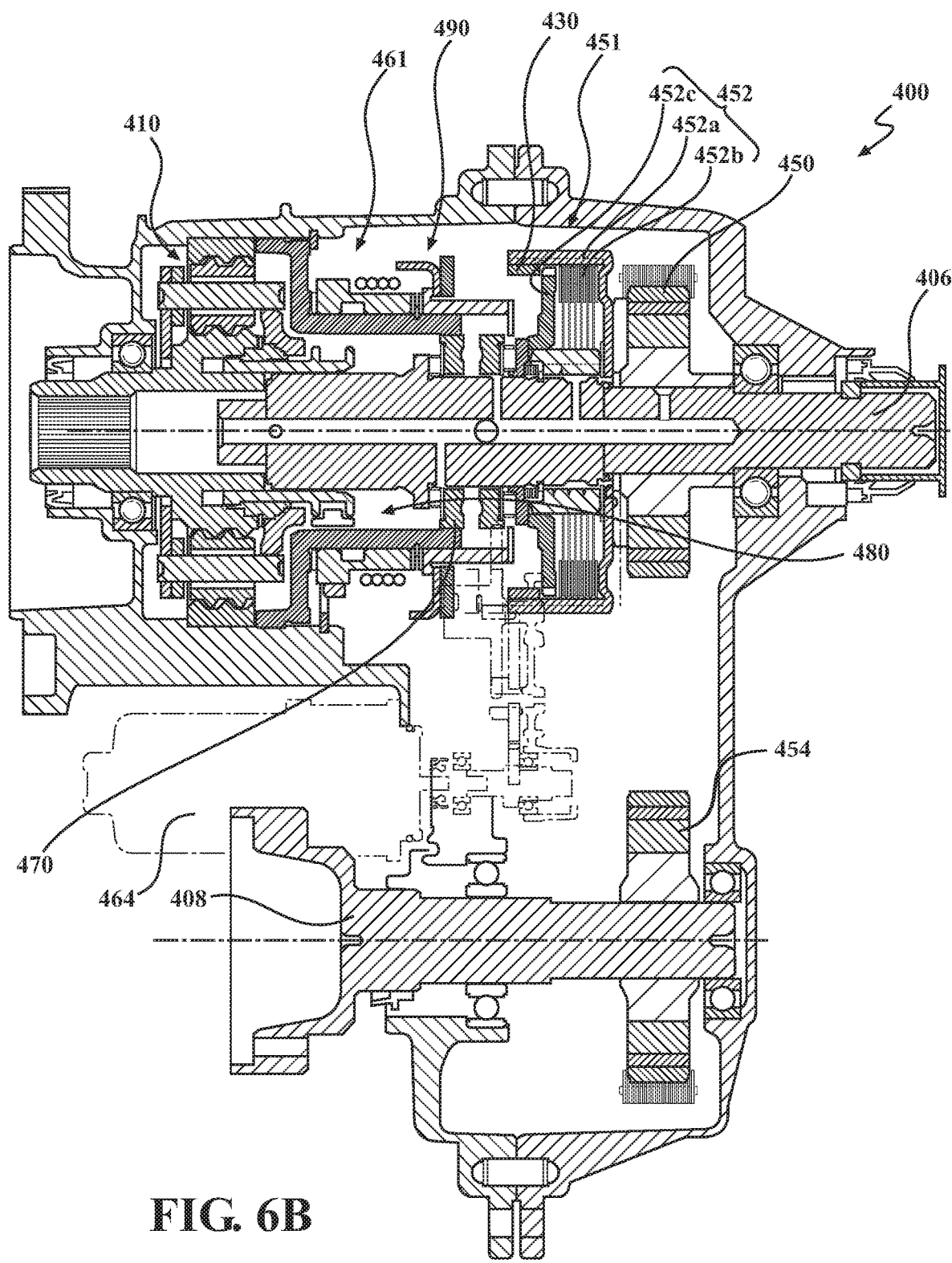
FIG. 6B is a cross-sectional view of the transfer case of FIG. 6A in a second configuration.
Figure 6C:
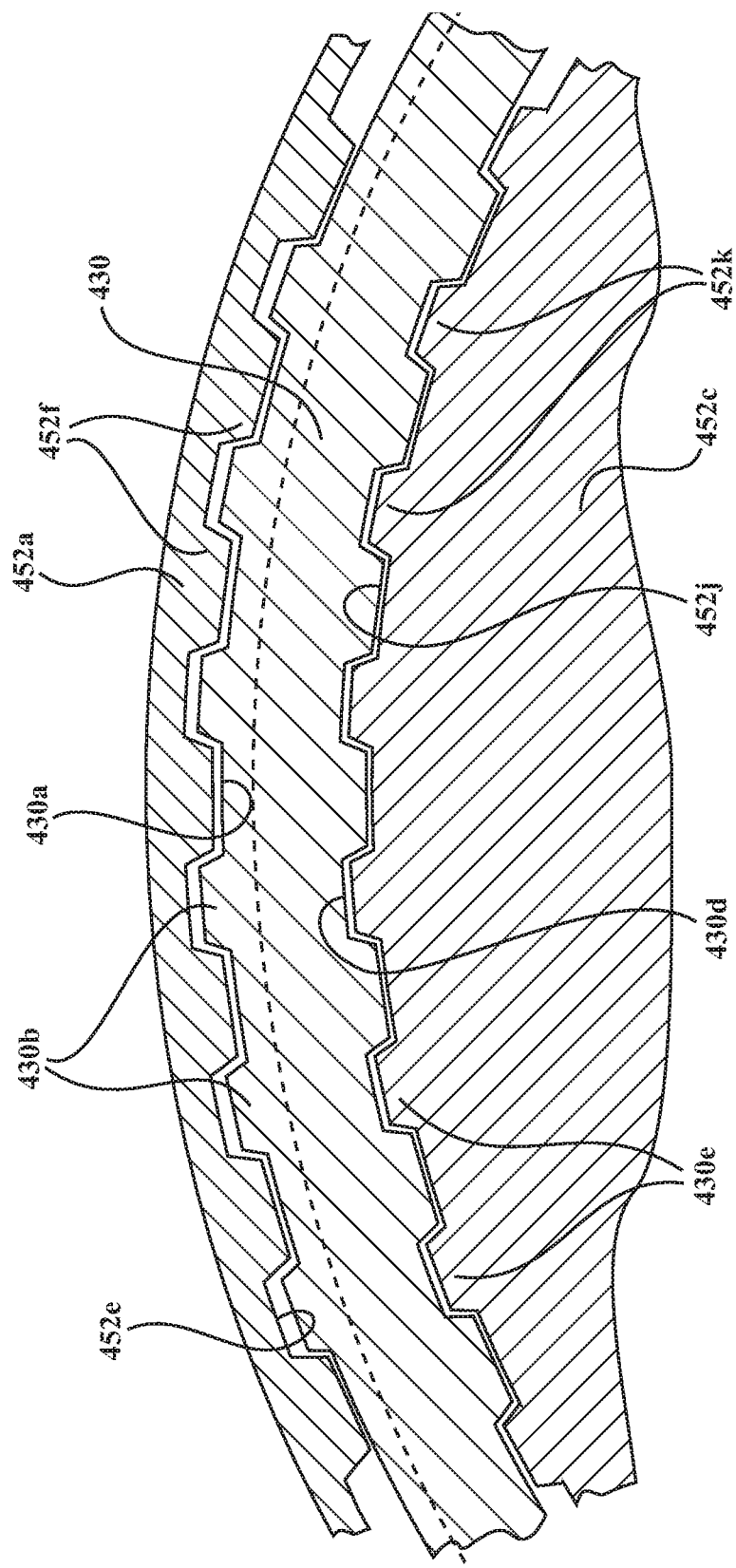
FIG. 6C is a partial cross-sectional view of the transfer case of FIG. 6A taken along line 6C-6C.
Figure 6E:
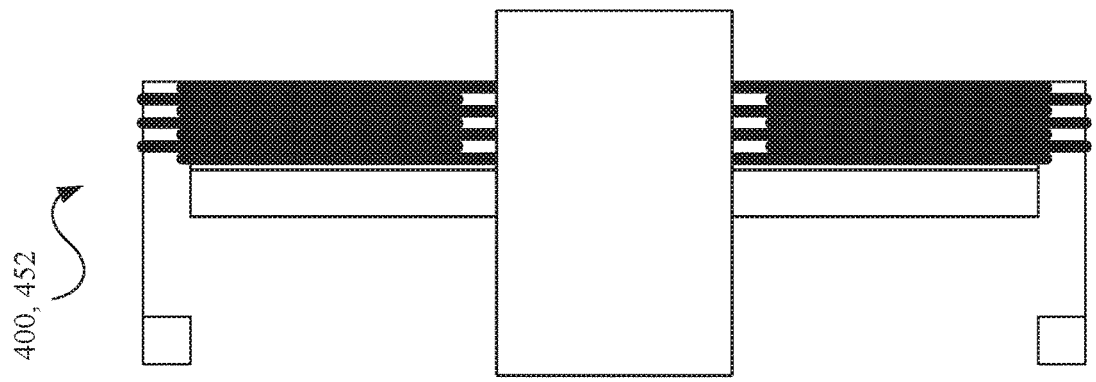
FIG. 6E is a cross-sectional schematic view of the portion of the transfer case shown in FIG. 6D in the second configuration.
Figure 6F:
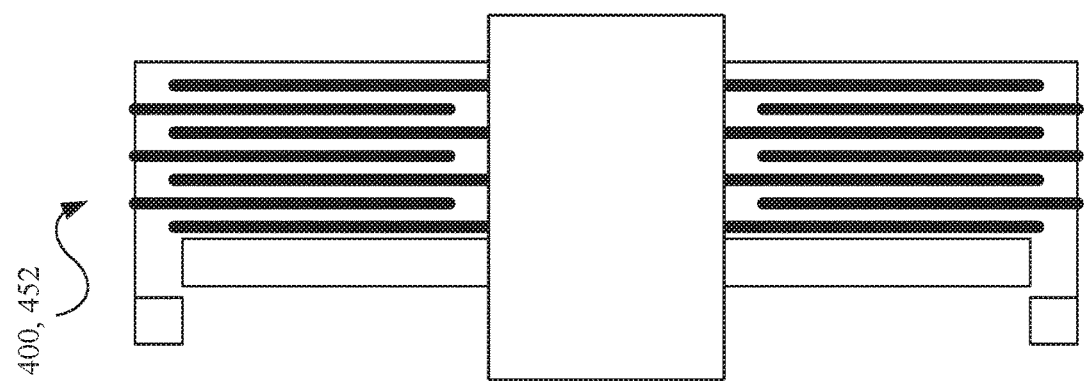
FIG. 6F is a cross-sectional schematic view of the portion of the transfer case shown in FIG. 6D in a third configuration.
Figure 6D:
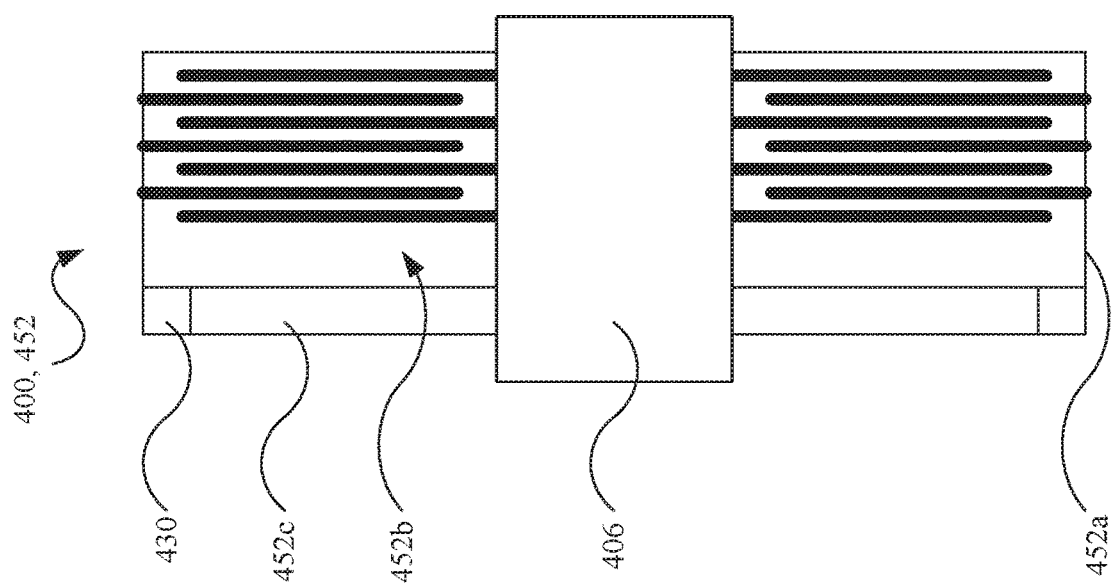
FIG. 6D is a cross-sectional schematic view of a portion of the transfer case of FIG. 6A in the first configuration.
Figure 7A:
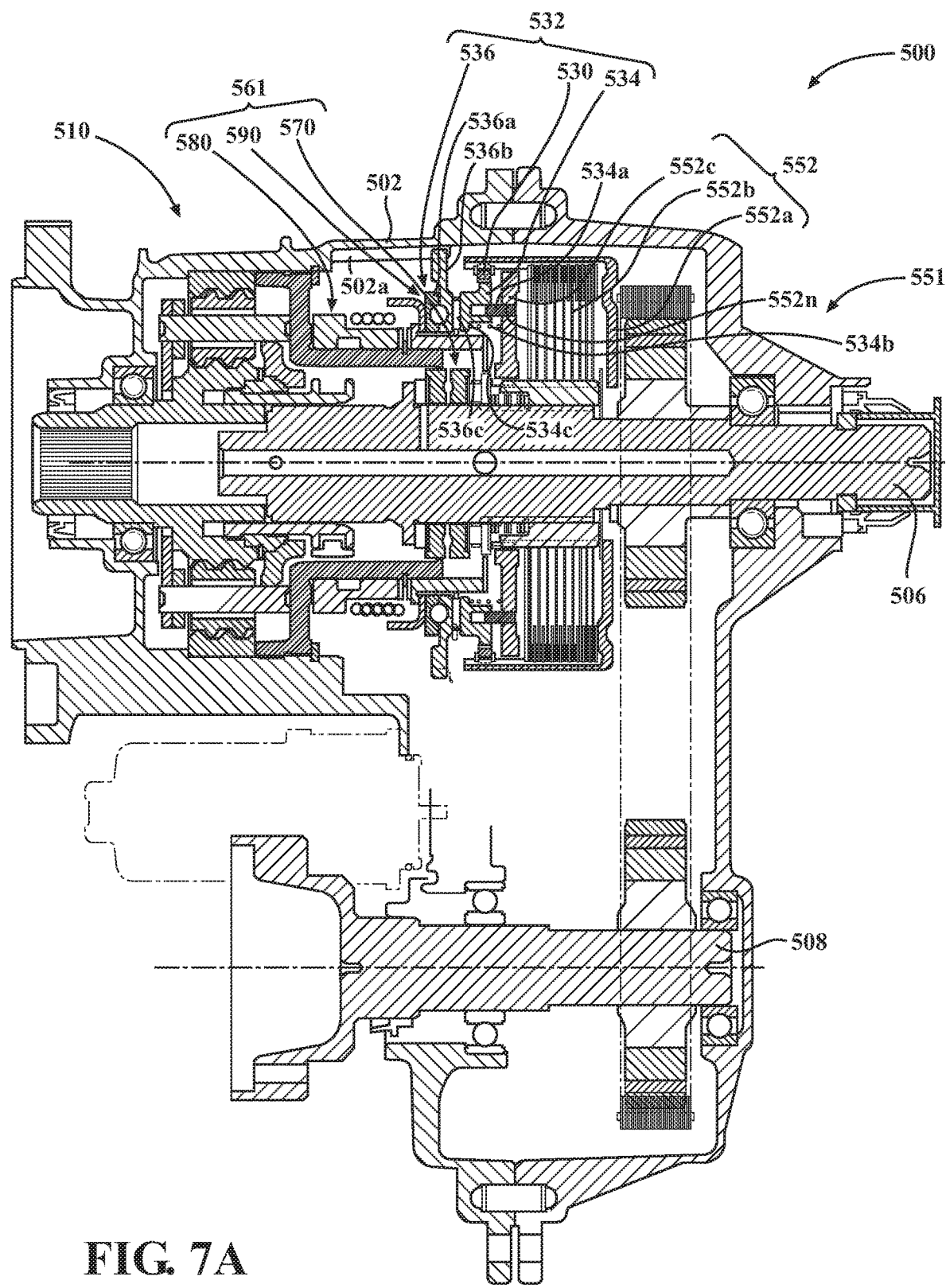
FIG. 7A is a cross-sectional view of a transfer case according to another exemplary embodiment shown in a first configuration.
Figure 7B:
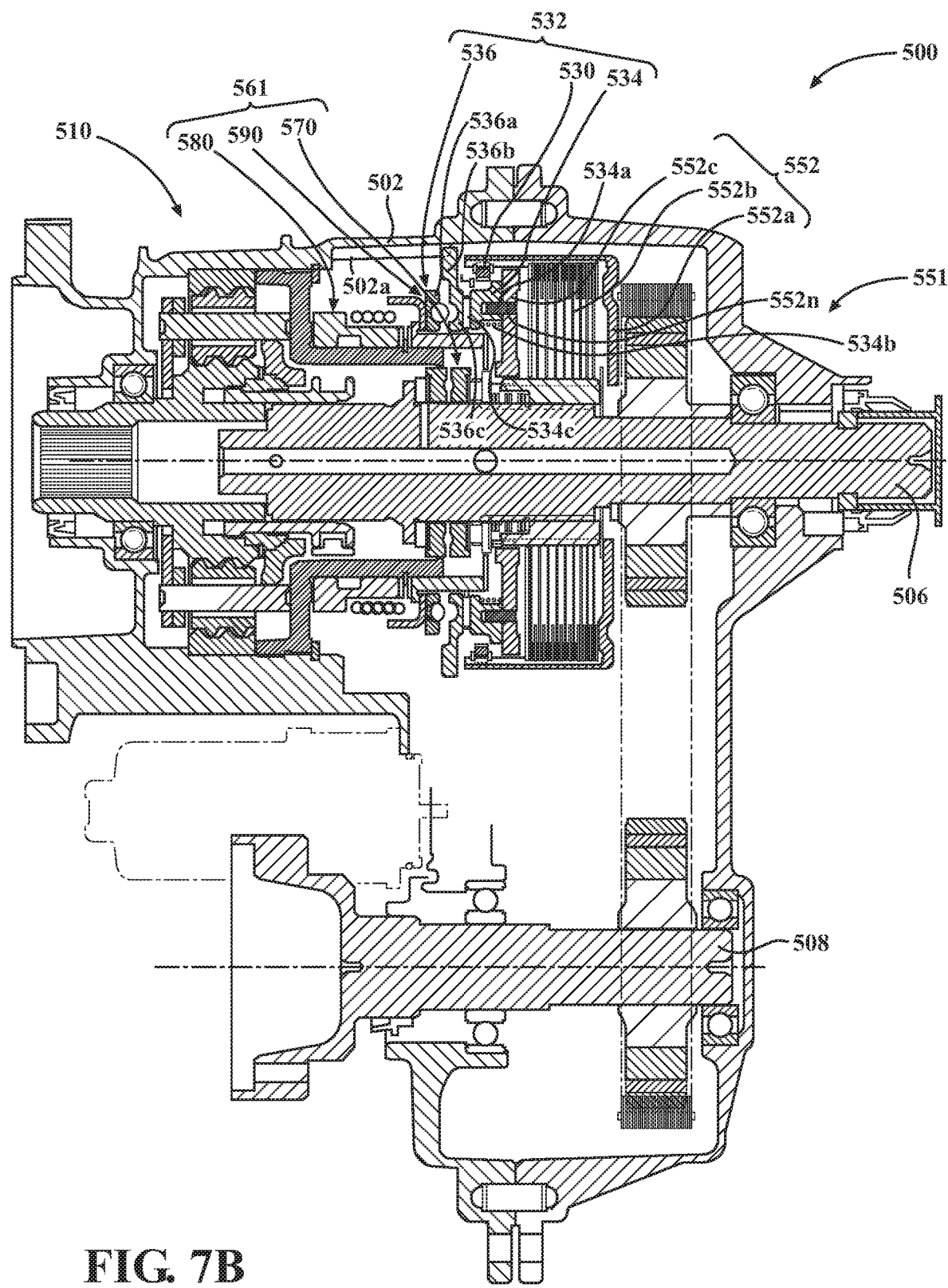
FIG. 7B is a cross-sectional view of the transfer case of FIG. 7A shown in a second configuration.

FIG. 3 is a cross-sectional illustration showing the transfer case 300, while FIGS. 4-5 depict an actuation system 361 of the transfer case 300 in isolation. The transfer case 300 generally includes a gear reduction mechanism 310 and a secondary torque transfer mechanism 351, which include similar components (not all shown or labeled in the cross-sectional view of FIG. 3) and functionality of the gear reduction mechanism 210 and secondary torque transfer mechanism discussed previously, along with an actuation system 361 (e.g., actuator or actuation mechanism) that functions to operate both the gear reduction mechanism 310 and the secondary torque transfer mechanism 351. Components and assemblies of the transfer case 300, having generally the same and/or similar function as those of the transfer case 200, are generally described with common naming and numbering increasing by 100 (e.g., gear reduction mechanism 210 and gear reduction mechanism 310) across different embodiments.

As compared to the transfer case 200, the orientation of the plate clutch 352 and sprocket 350 of the secondary torque transfer mechanism 351 are reversed front to rear with the plate clutch 352 having its apply plate 352c facing forward, and the plate clutch 352 itself being disposed forward of the sprocket 350. The actuation system 361 is generally positioned axially between the gear reduction mechanism 310 and the plate clutch 352. The actuation system 361 engages the reduction hub 322 to operate the gear reduction mechanism 310 and is further configured to engage the apply plate 352c of the plate clutch 352 to operate the secondary torque transfer mechanism 351.

As shown in FIGS. 4-5, the actuation system 361 generally includes an actuator base 362, a motor 364 with reduction gears 366, a secondary torque transfer actuator mechanism 370 (e.g., plate clutch actuator, first actuator mechanism), a gear reduction actuator mechanism 380 (e.g., dog clutch actuator, second actuator mechanism), and a drive gear assembly 390 (e.g., drive assembly). Generally speaking, the motor 364, by way of the reduction gears 366, rotates the drive gear assembly 390, which, in turn, causes sequential (i.e., serial, staged) operation of the gear reduction actuator mechanism 380 and the torque transfer actuator mechanism 370, each stage of rotation generally being associated with one of the actuator mechanisms 370, 380. For example, a first stage is associated with the gear reduction actuator mechanism 380. In the first stage (e.g., first or initial range of motion or rotation; first positive stage and first negative stage), the drive gear assembly 390 is rotated (e.g., +/− between 30 and 50 degrees from center, such as 35 degrees) by the motor 364 via the reduction gears 366 to operate the gear reduction actuator mechanism 380, which moves the gear reduction hub 322 (e.g., coupling) into the first position (e.g., high range at +35 degrees) or the second position (e.g., low range at −35 degrees). In a second stage (e.g., second, continued, or subsequent range of motion or rotation from ends of the first stage; second positive stage, and second negative stage), the drive gear assembly 390 is further rotated (e.g., +/− an additional 10-30 degrees, such as 25 degrees, meaning +35 degrees to +60 degrees and −35 degrees to −60 degrees) by the motor 364 to operate the secondary torque transfer actuator mechanism 370, which presses the clutch apply plate 352c to compress the interleaved plates 352b within the clutch housing 352a. As discussed in further detail below, the torque transfer actuator mechanism 370 and gear reduction actuator mechanism 380 each include cam mechanisms, which include advance and/or retreat movement regions and/or dwell regions that, in conjunction with the drive gear assembly 390, provided for the staged operation.

According to other exemplary embodiments, the various stages of operation of the actuator system 361 may be configured differently, for example, with different ranges of motion in the first and/or second stage (i.e., greater or lesser), different bidirectional ranges for each direction of motion within a given stage (e.g., +35 degrees in the first positive stage, and −25 degrees in the first negative stage), overlapping ranges of motion between stages (e.g., +/−35 degrees in the first stage, and +30 to +60 and −30 to −60 in the second positive and negative stages), with gaps between the ranges of motion (e.g., +/−30 degrees in the first stage, and +35 to +60 and −35 to −60 in the second positive and negative stages), with additional stages (e.g., to operate other actuator mechanisms), and/or with unidirectional stages associated with one or more of the actuator mechanisms (e.g., rotation in only one direction causes the actuator mechanism to operate).

As seen in FIG. 3, the actuator base 362 is a generally rigid, stationary member that fixedly couples the actuation system 361 (e.g., actuator system or mechanism) to the housing 302 of the transfer case 300. The actuator base 362 generally includes a base portion 362a (e.g., a forward or radially outer portion), which couples to the housing 302 of the transfer case 300 proximate the gear reduction mechanism 310, for example, with a thrust washer, an interference fit, and/or other fasteners. The actuator base 362 also includes a generally cylindrical body or body portion 362b (e.g., a radially inner or annular portion or stem), which extends rearward axially away from the actuator base portion 362a toward the plate clutch 352. The actuator base 362 includes a central bore (not labeled) through which the primary output shaft 306 extends. Other components of the actuation system 361 are fixedly or movably coupled to the body portion 362b as discussed below.

As seen in FIGS. 3-5, the motor 364, by way of the reduction gears 366, is configured to rotate the drive gear assembly 390 about the actuator base 362, which in turn causes the secondary torque transfer actuator mechanism 370 to operate the plate clutch 352 and causes the gear reduction actuator mechanism 380 to move the gear reduction hub 322. The motor 364 is fixedly coupled to, and the reduction gears 366 are rotatably coupled to the housing 302 at positions located radially outward of the primary output shaft 306.

The gear reduction actuator mechanism 380 functions as a cylindrical or barrel cam mechanism, which moves the gear reduction hub 322 between the first and second positions during the first stage (e.g., initial rotation of the drive gear assembly 390 from a center). The gear reduction actuator mechanism 380 includes a shift fork 382 and a barrel 384 (e.g., shift cam). With rotation, the barrel 384 is configured to displace the shift fork 382 forward and rearward axially within the transfer case 300, so as to move the gear reduction hub 322 between the first or forward position (i.e., in which the gear reduction hub 322 directly couples input shaft 304 and the primary output shaft 306; establishing the high range) and the second or rearward position (i.e., in which the gear reduction hub 322 couples the input shaft 304 and the primary output shaft 306 by way of the gear reduction mechanism 310; establishing the low range).

The shift fork 382 is a generally arcuate member positioned substantially within the central bore of the body portion 362b of the actuator base 362 and radially outward of the primary output shaft 306. The shift fork 382 is generally semicircular having an inner flange 382a that extends radially inward from an inner peripheral surface of the shift fork 382. The inner flange 382a is positioned between and engages radially outwardly extending, peripheral flanges of the gear reduction hub 322, such that axial movement of the shift fork 382 moves the gear reduction hub 322 axially between the first and second positions.

The shift fork 382 also includes two followers 382b configured as rollers, each extending radially outward from the outer peripheral surface of the shift fork 382 through an axially extending slot (not shown) in the body portion 362b of the actuator base 362 to be engaged by the barrel 384 (discussed below). The axially extending slot of the body portion 362b of the actuator base 362 maintains the shift fork 382 in a constant rotational position relative to the actuator base 362, while allowing the shift fork 382 to translate axially. The two followers 382b are positioned substantially opposite each other (i.e., approximately 180 degrees apart) at, or proximate to, ends of the shift fork 382. Each follower 382b is coupled to and rotates about an axle (not labeled), which extends substantially radially outward from ends of the shift fork 382 (e.g., perpendicular to the outer peripheral surface). The shift fork 382 may additionally include a boss or protrusion for each follower 382b extending radially outward from the outer peripheral surface to which the axle is coupled.

The barrel 384 is a generally cylindrical member that surrounds the body portion 362b of the actuator base 362 and is configured to rotate thereabout to axially move the shift fork 382. The barrel 384 includes an inner peripheral surface that bears against an outer peripheral surface of the body portion 362b of the actuator base 362. One or more thrust washers 367 and/or snap clips 368 are coupled to the outer periphery of the body portion 362b at an intermediate axial location thereof, as well as adjacent the base portion 362a. As the barrel 384 rotates about the body portion 362b of the actuator base 362, edges of the barrel 384 may slide and bear against the thrust washers 367 to transfer an axial force for moving the gear reduction hub 322 relative to the actuator base 362 forward and rearward.

The barrel 384 includes an inner cam slot 384a configured to engage and axially move the shift fork 382 and, thereby, move the gear reduction hub 322 between the first and second positions. Each cam slot 384a extends radially outward from the inner peripheral surface of the barrel 384 with one of the followers 382b of the shift fork 382 being positioned in each cam slot 384a. Each cam slot 384a includes a movement region having opposed helically ramped surfaces that engage the follower 382b during the first movement stage (i.e., initial rotation of the barrel 384 and drive gear assembly 390 from center) to move the shift fork 382 axially forward and rearward. The movement region is flanked by dwell or flat regions in which the cam slot 384a maintains the follower 382b in a generally fixed axial position in the second movement stage (e.g., continued positive and negative rotation from respective ends of the first positive stage and the first negative stage) and any subsequent movement.

In order to rotate the barrel 384, the barrel 384 includes an outer radial flange or member 384b, which is positioned radially outward of an outer peripheral surface of the barrel 384 and extends axially rearward from a forward end of the barrel 384. The outer radial member 384b is engaged by a torsion spring 386, which transfers torque from the drive gear assembly 390 to rotate the barrel 384. More particularly, the torsion spring 386 is positioned between the outer peripheral surface of the barrel 384 and the outer radial member 384b and is wound about and bears against the outer peripheral surface of the barrel 384. The torsion spring 386 includes two ends 386a that extend radially outward to engage axially-extending edges of the outer radial member 384b and to engage the drive gear assembly 390 to transfer torque therebetween. In the case of a blocked shift event (i.e., when splines of the reduction hub 322 engage ends of splines of the input shaft 304 or planet carrier (not shown, refer to gear reduction mechanism 210 above) of the gear reduction mechanism 310), the torsion spring 386 allows for relative rotational motion between the barrel 384 and the drive gear assembly 390, while storing energy that causes axial movement of the reduction hub 322 once properly aligned with the input shaft or gear reduction mechanism 310.

The secondary torque transfer actuator mechanism 370 functions as a face cam mechanism (e.g., is a face cam, such as a ball ramp mechanism) to convert continued rotation of the drive gear assembly 390 into axial movement for operating the plate clutch 352 within the second stage of rotational movement (e.g., continued rotation from approximate ends of the first stage). The secondary torque transfer actuator mechanism 370 includes a forward member 372 (e.g., first plate or ring) and a rearward member 374 (e.g., second plate or ring), which are configured for relative rotation therebetween and resultant relative axial displacement for engaging the plate clutch 352. Both the forward member 372 and the rearward member 374 include central apertures or bores through which the primary output shaft 306 extends. The forward member 372 is coupled to a rearward end of the body portion 362*b* of the actuator base 362, while the rearward member 374 is configured to both rotate and move axially relative to the forward member 372 thereby moving the actuator base 362. For example, as shown, the forward member 372 is positioned within the central bore extending through the body portion 362*b* of the actuator base 362 and may be coupled thereto by a press-fit, interference fit, or splined connection. The forward member 372 is positioned against a bearing member coupled to the output shaft 306 to prevent forward axial movement thereof. The rearward member 374 is configured to be rotated by the drive gear assembly 390 relative to the forward member 372, as discussed in further detail below, and is positioned to press the apply plate 352*c* via an intermediate bearing. The intermediate bearing allows the apply plate 352*c* to spin with the output shaft 306 independent of the rearward member 374, which rotates back and forth within a limited range of motion of the second stage.

At least one of the forward member 372 or rearward member 374 includes an inner surface (i.e., facing the other plate; not shown) that includes two movement advance regions that are helically ramped in opposite directions. Each of a plurality of followers or rollers (e.g., balls) bear against the inner surfaces of both members 372, 374, such that rotation of the rearward member 374 from a center causes the rearward member 374 to displace axially rearward to engage the apply plate 352*c* of the plate clutch 352 and, thereby, operate the secondary torque transfer mechanism 351. As discussed below, the drive gear assembly 390 is configured to not engage the followers 374*a* during the first movement stage (e.g., initial rotation of the drive gear assembly 390 from center), so as to not operate the secondary torque transfer actuator mechanism 370. However, the forward and rearward members 372, 374 may instead or additionally include dwell regions for the first movement stage in which rotation does not cause axial movement of the rearward member 374 and/or any subsequent movement stage.

In order to rotate the rearward member 374 relative to the forward member 372, the rearward member 374 is configured to receive application of one or more tangential forces from the drive gear assembly 390 (discussed in further detail below). The rearward member 374 includes one or more followers 374*a* configured as rollers extending radially outward from a periphery of the rearward member 374. For example, the rearward member 374 may include two followers 374*a* that are positioned substantially opposite each other (i.e., approximately 180 degrees apart). Each follower 374*a* is coupled to and rotates about an axle (not labeled), which extends radially from the periphery of the rearward member 374 (e.g., perpendicular to an outer surface thereof). The rearward member 374 may additionally include a boss or protrusion for each follower 374*a* extending radially outward from the periphery of the rearward member 374 to which the axle and follower 374*a* are coupled.

As mentioned previously, the drive gear assembly 390 is configured to be rotated by the motor 364 via the reduction gears 366 in order to operate the secondary torque transfer actuator mechanism 370 and the gear reduction actuator mechanism 380. The drive gear assembly 390 generally includes a sense plate 392 (e.g., a first plate), a hub 394, and a gear plate 396 (e.g., a second plate), which are fixedly coupled to each other to be rotated in unison by the motor 364. When the motor 364 drives the gear plate 396 by way of the reduction gears 366, the hub 394 engages the followers 374*a* to operate the secondary torque transfer actuator mechanism 370, and the sense plate 392 engages the torsion spring 386 to operate the gear reduction actuator mechanism 380. The drive gear assembly 390 is positioned about the actuator base 362 with an inner peripheral surface of the hub 394 bearing on the outer peripheral surface of the body portion 362*b* of the actuator base 362. The drive gear assembly 390 is held axially on the actuator base 362 between one of the thrust washers 367 and an end plate coupled to the body portion 362*b* of the base 362. While the drive gear assembly 390 may alternatively be provided as a single component or two primary components, an assembly of the sense plate 392, the hub 394, and the gear plate 396 may provide for less complicated manufacturing, while allowing each component to be configured individually (e.g., to optimize material type according to strength, weight, and cost considerations).

The gear plate 396 is configured to receive an input torque from the motor 364 via the reduction gears 366 through a first movement stage, second movement stage, and any subsequent movement stages of the drive gear assembly 390. The gear plate 396 is a unitary, generally planar member having a central bore or aperture defined by an inner periphery 396*a* and an outer periphery 396*b*. The primary output shaft 306, along with other components of the actuator system 361, extends through the central aperture of the gear plate 396. The outer periphery 396*b* of the gear plate 396 includes a plurality of teeth that mesh with mating teeth of the reduction gears 366, so as to be rotated by the motor 364. Because the actuator system 361 operates within a limited range of rotational motion in the first and second movement stages (e.g., +/−60 degrees), as described above for operating both the secondary torque transfer actuator mechanism 370 and the gear reduction actuator mechanism 380, only a portion of the outer periphery 396*b* (e.g., 180 degrees) may include teeth. The gear plate 396 may, for example, be made from powdered metal steel and, as discussed in further detail below, may include various features to facilitate coupling to the sense plate 392 and/or the hub 394.

The sense plate 392 is configured to be driven by the gear plate 396 for operating the gear reduction actuator mechanism 380. The sense plate 392 may also be configured with a position sensor 369 for monitoring the rotational position of the actuator system 361. The sense plate 392 is a unitary member, which generally includes a planar portion 392*a* with a central bore or aperture defined by an inner periphery 392*b* and also includes first and second annular flanges 392*c*, 392*d*, which extend forward axially from an outer periphery of the planar portion 392*a*. In the drive gear assembly 390, the planar portion 392*a* is positioned forward of and adjacent to a forward surface of the gear plate 396. The first flange 392*c* extends substantially circumferentially (e.g., approximately 270 degrees) about the outer periphery of the planar portion 392*a*. The second flange 392*d* is configured relative to the outer radial member 384*b* of the barrel 384 to transfer torque therebetween via the torsion spring 386. More particularly, the second flange 392*d* is positioned between the circumferential ends of the first flange 392*c* and has a width that is complementary to the width of the outer radial member 384*b* of the barrel 384, such that both the outer radial member 384*b* of the barrel cam 384 and the second flange 392*d* of the sense plate 392 are positioned between and engaged by the ends 386*a* of the torsion spring 386. The second flange 392*d* is additionally, positioned radially between the coil of the torsion spring 386 and the outer radial member 384*b* of the barrel cam 384. The sense plate 392 may, for example, be made from powdered metal steel, aluminum, polymers or composites, etc. and, as discussed in further detail below, may include various features to facilitate coupling to the hub 394 and/or gear plate 396.

The hub 394 is configured to be driven by the gear plate 396 to operate the secondary torque transfer actuator mechanism 370, for example, in limited ranges of motion of the drive gear assembly 390. During the first movement stage (e.g., initial rotation from center in which the secondary torque transfer actuator mechanism 370 moves the gear reduction hub 322, as discussed previously), the hub 394 rotates freely of the secondary torque transfer actuator mechanism 370, so as to not engage the plate clutch 352. During continued rotation in the second movement stage (e.g., continued positive and negative rotation from respective ends of the first stage), the hub 394 engages the secondary torque transfer actuator mechanism 370.

The hub 394 is a unitary member, which generally includes a base portion 394*a* (e.g., radial flange) with a central aperture, and includes an annular body 394*b* extending axially from an inner periphery of the base portion 394*a*, which rotates about and bears against the body portion 362*b* of the actuator base 362. As part of the drive gear assembly 390, the annular body 394*b* extends rearward through the central apertures of the sense plate 392 and the gear plate 396 with the sense plate 392 being held between the base portion 394*a* of the hub 394 and the gear plate 396. The hub 394 may, for example, be made from powdered metal steel, aluminum, polymers or composites, etc. and, as discussed in further detail below, may include various features to facilitate coupling to the sense plate 392 and/or the gear plate 396.

The hub 394 additionally defines slots 394*c* (e.g., cutouts) in the annular body 394*b* in which the followers 374*a* of the secondary torque transfer actuator mechanism 370 are positioned. Each slot 394*c* is defined between two circumferentially opposing end walls 394*d* (e.g., tracks) of the annular body 394*b*, which extend axially rearward. The slots 394*c* are sized equally and are circumferentially spaced according to spacing of the followers 374*a* to provide simultaneous engagement of the followers 374*a* during rotation of the drive gear assembly 390. During the first movement stage, the followers 374*a* each remain in a middle region of the slot 394*c* between the opposed end walls 394*d*. With continued rotation in the second movement stage, each of two end walls 394*d*, one from each slot 394*c*, simultaneously engage and apply a tangential force to one of the followers 374*a* to rotate the rearward member 374 of the secondary torque transfer actuator mechanism 370. With this rotation, the rearward member 374 displaces axially rearward from the forward member 372, while the followers 374*a* roll rearward along the opposed end walls 394*d*. The end walls 394*d* have an axial length allowing the followers 374*a* to travel thereon through the full range of axial displacement of the secondary torque transfer actuator mechanism 370.

As referenced above, the drive gear assembly 390 includes the sense plate 392, the hub 394, and the gear plate 396, which are fixedly coupled together to rotate in unison as a single unit. According to the embodiment shown in FIGS. 3-5, the sense plate 392, the hub 394, and the gear plate 396 are coupled together via a press-fit, splined arrangement. More particularly, the annular body 394*b* (e.g., inner peripheral flange) of the hub 394 is configured to be inserted into the central bore of the sense plate 392 and the central bore of the gear plate 396. The diameter of the outer surface of the annular body 394*b* of the hub 394 nominally has an outer diameter that is slightly smaller than the inner diameters of the inner peripheries 392*b* and 396*a* of the sense plate 392 and the gear plate 396, respectively. The annular body 394*b* includes a plurality of coupling splines 394*j* extending axially and protruding radially outward from the outer surface of the annular body 394*b* in one or more regions to tightly engage and couple with the inner peripheries 392*b* and 396*a* of the sense plate 392 and the gear plate 396. The coupling splines 394*j* may, for example, be configured to deform or cut material forming the inner peripheries 392*b* and 396*a* as the sense plate 392 and the gear plate 396 are pressed successively onto the annular body 394*b* of the hub 394. The annular body 394*b* may additionally include one or more alignment splines 394*k* extending axially and protruding radially outwardly from the outer surface of the annular body 394*b* at one or more locations to be received within alignment slots 392*f* and 396*c* of the sense plate 392 and the gear plate 396, respectively. During operation, the motor 364, by way of the reduction gears 366, engages and rotates the gear plate 396, which transfers torque to the hub 394 by way of the splined connection, which in turn transfers torque to the sense plate 392 by way of the splined connection.

According to an exemplary embodiment, as shown in FIGS. 6A-6F, a transfer case 400 is configured similar to the transfer case 300 (described previously), while also being configured to positively couple (i.e., lock, as opposed to friction coupling) a primary output shaft 406 (e.g., primary shaft) to a secondary output shaft 408 (e.g., secondary shaft). Systems, mechanisms, and components having like structure and/or function are generally referred to with reference numerals increasing by 100 (i.e., 400 as opposed to 300). In particular, a secondary torque transfer mechanism 451 includes a plate clutch 452 having a clutch housing 452*a* and an apply plate 452*c* that is configured to selectively positively couple to the clutch housing 452*a* and, thereby, form a positive coupling or connection between the primary output shaft 406 and the secondary output shaft 408. As used herein, the terms "positively couple," "positive coupling," or similar refer to a direct or indirect mechanical connection formed between two components, which is to be distinguished from a friction coupling (e.g., that provided by interleaved plates).

The plate clutch 452 generally includes the clutch housing 452*a* (e.g., housing), interleaved plates 452*b*, and the apply plate 452*c*, which are configured to operate similar to the clutches 252, 352 to frictionally couple (e.g., form a friction coupling between) the primary output shaft 406 and the secondary output shaft 408, while also being configured to positively couple the primary output shaft 406 and the secondary output shaft 408 as referenced above and as discussed in further detail below. The clutch housing 452a is rotationally coupled to the secondary output shaft 408 via a primary sprocket 450 that is coupled to the clutch housing 452a to rotate therewith, a secondary sprocket 454 that is coupled to the secondary output shaft 408 to rotate therewith, and a chain (not shown; refer to chains 256, 356) that extends between and transfers torque between the primary sprocket 450 and the secondary sprocket 454.

The apply plate 452c is configured to non-selectively rotate with the primary output shaft 406 (e.g., via a sliding splined connection; refer to discussion of clutches 252 and 352 above) and to be moved axially therealong by the secondary torque actuation mechanism 470 (refer to discussion of mechanism 370 above). In various axial positions of the apply plate 452c, the apply plate 452c positively couples the apply plate 452c to the clutch housing 452a, rotates independent of the clutch housing 452a and interleaved plates 452b, and operates the plate clutch 452 conventionally to compress the interleaved plates 452b to increase friction therebetween (refer to discussions of clutches 252 and 352 above). More specifically, in a first position (e.g., first, forward, or locking position or configuration; see FIGS. 6A and 6D) the apply plate 452c is positively coupled to the clutch housing 452a, which positively couples the primary output shaft 406 to the secondary output shaft 408 to transfer torque therebetween (e.g., forms a positive coupling). In a second position (see FIG. 6E; e.g., second, rearward, or friction position or configuration), the apply plate 452c fully compresses the interleaved plates 452b to transfer torque via frictional engagement therebetween (e.g., forming a friction coupling between the primary output shaft 406 and the secondary output shaft 408 to transfer torque therebetween). In a third position (e.g., third, intermediate, or disengaged position or configuration; see FIGS. 6B and 6F), which may be between the forward and rearward positions, the apply plate 452c engages neither the clutch housing 452a, nor the interleaved plates 452b, so as to rotate independent thereof and such that torque is not transferred between the primary output shaft 406 and the secondary output shaft 408 (i.e., the positive coupling and the friction coupling are not formed).

In each of the positions or configurations, the apply plate 452c forms a splined connection with the primary output shaft 406 and rotates therewith (i.e., forms a non-selective splined or rotational connection). The actuation system 461 is configured to move the apply plate 452c between positions.

To positively couple the apply plate 452c to the clutch housing 452a, a locking collar 430 (e.g., locking ring) is fixedly coupled to a forward portion 452d (e.g., end) of the clutch housing 452a and is selectively coupled to the apply plate 452c. The forward portion 452d of the clutch housing 452a forms a generally annular shape (e.g., circular) that receives the locking collar 430 therein, such that the locking collar 430 protrudes radially inward from an inner periphery 452e (e.g., inner housing periphery) of the clutch housing 452a. The inner periphery 452e of the clutch housing 452a has a complementary diameter and spline pattern to an outer periphery 430a of the locking collar 430 to form a fixed, splined connection therebetween. The inner periphery 452e of the clutch housing 452a includes a plurality of radially inner splines 452f (e.g., ribs) that define radially inner channels or slots therebetween. The inner splines 452f and channels therebetween may be those configured to also receive and engage a subset of the interleaved plates 452b (refer to discussion of interleaved plates 252b above). An outer periphery of the locking collar 430 includes radially outer splines 430b (e.g., ribs) that define radially outer slots or channels, which are complementary to the inner splines 452f and channels of the clutch housing 452a. The outer splines 430b of the locking collar 430 and the inner splines 452f of the clutch housing 452a are received between each other and apply tangential forces against each other, so as to transfer torque between the locking collar 430 and the clutch housing 452a. To accommodate the locking collar 430 at its forward end and the additional range of travel required of the apply plate 452c to travel between the forward, intermediate, and rearward positions, the clutch housing 452a extends further forward relative to the primary sprocket 450, as compared to the clutch housing 352a described previously.

To retain or maintain an axial position of the locking collar 430 within the forward portion 452d of the clutch housing 452a, the locking collar 430 may be press or friction fit into the forward portion 452d of the clutch housing 452a or may otherwise be inserted and retained therein (e.g., with fasteners). For example, the outer periphery 430a of the locking collar 430 (e.g., partially or wholly defined by the outer splines 430b and channels therebetween) may be compressed or otherwise tightly engage the inner periphery 452e of the clutch housing 452a (e.g., partially or wholly defined by the inner splines 452f and channels therebetween). An inner periphery 430d (e.g., inner collar periphery) of the locking collar 430 may be smaller than outer dimensions of the interleaved plates 452b, thus requiring that, during assembly, the locking collar 430 be coupled to the forward portion 452d of the clutch housing 452a after the interleaved plates 452b are inserted into the clutch housing 452a. According to other exemplary embodiments, the locking collar 430 may be coupled to the clutch housing 452a in other locations or manners (e.g., being received partially over the forward portion 452d of the clutch housing 452a).

To positively couple the apply plate 452c to the locking collar 430, the apply plate 452c is configured to selectively form a splined connection therewith. The apply plate 452c is a generally circular member having a rear surface that presses against a first of the interleaved plates 452b, a forward surface of the secondary torque actuator mechanism 470 or an intermediate member (e.g., a bearing), and an outer periphery 452j therebetween. The outer periphery 452j of the apply plate 452c has a complementary diameter and spline pattern to the inner periphery 430d of the locking collar 430 to form a selective splined connection therewith. The apply plate 452c includes radially outer splines 452k (e.g., teeth) that define radially outer channels or slots therebetween. The inner periphery 430d of the locking collar 430 includes radially inner splines 430e (e.g., teeth) that define inner slots or channels therebetween. When the apply plate 452c is in the first or forwardmost position, the outer splines 452k of the apply plate 452c and the inner splines 430e of the locking collar 430 are positioned between each other to engage each other in a tangential direction, so as to positively couple and transfer torque between the apply plate 452c and the locking collar 430.

To facilitate receipt of the inner splines 430e and the outer splines 452k between each other when the apply plate 452c is moved forward from the rearward position to the forward position, the inner splines 430e and the outer splines 452k may include or form tapered leads at engaging ends thereof (i.e., rearward and forward ends, respectively). While the splines 430e and 452k have generally constant widths and spacing therebetween, the tapered leads are formed by the splines 430e and 452k tapering toward an end that has a narrower width than the remainder of the splines 430e and

452$k$. The narrower ends of the splines 430$e$ and 452$k$ lessen a range of relative rotational positions between the locking collar 430 and the apply plate 452$c$ in which the ends of the splines 430$e$ and 452$k$ might directly engage each other and prevent axial receipt of each other therebetween (i.e., a blocked shift event).

The actuation system 461 by way of the secondary torque actuator mechanism 470 is configured to move the apply plate 452$c$ from the first or forwardmost position rearward to the second or intermediate position and further rearward to the third or rearmost position. The actuation system 461 is configured similar to the actuation system 361 by including a gear reduction actuator mechanism 480 configured as a barrel cam (refer to discussion of gear reduction actuator mechanism 780 above), a secondary torque actuator mechanism 470 (refer to discussion of actuator mechanism 370 above), and a drive gear assembly 490 (refer to discussion of drive gear assembly 390 above) that is rotated by a motor 464 to operate the actuator mechanisms 470, 480.

The actuation system 461 is configured to form the positive coupling and the friction coupling in different stages of rotation. More particularly, the actuation system 461 functions as a face cam mechanism (e.g., a ball ramp mechanism, as described previously), which moves the apply plate 452$c$ axially into the locked, disengaged, and friction positions (e.g., configurations) as the actuation system 461 (e.g., the drive gear assembly 490) is rotated in the different stages. To move the apply plate 452$c$ forward toward the forward position, a spring 452$m$ presses the apply plate 452$c$ in an axial direction against the secondary torque actuator mechanism 470 (or an intermediate member or assembly, such as a bearing) away from the interleaved plates 452$b$. When the drive gear assembly 490 is rotated in a reverse direction, the spring 452$m$ presses against the apply plate 452$c$ causing the apply plate 452$c$ to move axially forward into the second and forward positions as permitted by the secondary torque actuator mechanism 470.

Additional stages of rotation of the actuation system 461 may also allow for operation of the gear reduction actuation system 480 to select different drive ratios of the transfer case 400. In one example, when the apply plate 452$c$ is in the intermediate position, the actuation system 461 is rotated in a first direction to first operate the gear reduction actuator mechanism 480 (i.e., for selecting one of the high or low drive ratios) and then rotated further in the same direction to subsequently operate the secondary torque actuator mechanism 470 (e.g., to move the apply plate 452$c$ to the locking position or to the friction position to positively or frictionally couple the primary output shaft 406 to the secondary output shaft 408). Rotation in a second direction selects the other of the high or low drive ratios and then selects the other of the locking position or the friction position.

In another example, the actuation system 461 is configured to rotate the drive gear assembly 490 through various stages of rotation to sequentially operate a gear reduction mechanism 410 and the secondary torque transfer mechanism 451. During a first stage of rotation in positive and negative directions (i.e., first positive stage and first negative stage), the drive gear assembly 490 is rotated by the motor 464 to operate the gear reduction actuator mechanism 480 (refer to discussion of actuator mechanism 380 above) to select a high or low drive ratio. In this first stage of rotation, the apply plate 452$c$ is maintained in the forward position (i.e., positively coupled to the clutch housing 452$a$ by way of the locking collar 430), and in particular, the secondary torque actuator mechanism 470 is configured to not move the apply plate 452$c$ axially. For example, the drive gear assembly 490 may be configured to not engage the secondary torque actuator mechanism 470 during the first stage of rotation (refer to slot 394$c$ in hub 394 of drive gear assembly 390 above), or the secondary torque actuator mechanism 470 may have a dwell region associated with this first stage of rotation (refer to the discussion of actuator mechanism 370, which is configured as a face cam, as described above).

In a second stage of rotation, the actuator system 461 is configured to disengage or unlock the secondary torque transfer mechanism 451. During this second stage of rotation, which occurs in positive and negative directions substantially after the first stage of rotation (i.e., second positive stage and second negative stage), the drive gear assembly 490 engages and rotates the secondary torque actuator mechanism 470, which operates as a face cam displacing axially rearward to thereby push the apply plate 452$c$ (or an intermediate member or assembly, such as a bearing). The secondary torque actuator mechanism 470 may thereby move the apply plate 452$c$ axially rearward into the second or intermediate position and out of engagement with the locking collar 430. In the rearward position, the apply plate 452$c$ does not compress the interleaved plates 452$b$, for example, by being positioned forward thereof. During this second stage of rotation, the gear reduction actuator mechanism 480 is configured to not further move any component of the gear reduction mechanism 410, for example, by having a dwell region corresponding to this second stage of rotation (refer to discussion of actuator mechanism 380 above).

In a third stage of rotation, the actuator system 461 is configured to engage the secondary torque transfer mechanism 451 via the plate clutch 452. During this third stage of rotation, which occurs in the positive and negative directions substantially after the second stage or rotation (i.e., third positive stage and third negative stage), the drive gear assembly 490 continues to engage and rotate the secondary torque actuator mechanism 470. This continued rotation causes the secondary torque actuator mechanism 470 to displace the apply plate 452$c$ further axially rearward and, thereby, engage and gradually compress the interleaved plates 452$b$. This third stage of rotation continues until the secondary torque actuator mechanism 470 and the apply plate 452$c$ are moved rearward into the third or rearmost position in which the apply plate 452$c$ fully compresses the interleaved plates 452$b$. As with the second stage of rotation, during this third stage of rotation, the gear reduction actuator mechanism 480 is configured to not further move any component of the gear reduction mechanism 410, for example, by having a dwell region corresponding to this third stage of rotation. According to other exemplary embodiments, the actuation system 461 may be configured to not compress the interleaved plates 452$b$ in one of the positive or negative directions, such that in only one of the high or low drive ratio does the transfer case 400 operate the plate clutch 452 conventionally to form a friction coupling between the primary output shaft 406 and the secondary output shaft 408.

According to another exemplary embodiment, as shown in FIGS. 7A-7E, a transfer case 500 is configured similar to transfer case 400 described previously by including a gear reduction mechanism 510, a secondary torque transfer mechanism 551, and an actuator system 561 (e.g., actuator) having a gear reduction actuation mechanism 580, a secondary torque actuation mechanism 570, and a drive gear assembly 590. Primary systems, mechanisms, and components having like structure and/or function are generally referred to with reference numerals increasing by 100 (i.e., 500 as opposed to 400). However, rather than directly engaging the apply plate 452c with the locking collar 430, the transfer case 500 instead includes a locking mechanism 532 that couples the apply plate 552c to a locking collar 530 (e.g., locking ring).

The locking collar 530 is configured substantially similar to the locking collar 430, including the manner by which the locking collar 530 is coupled to the clutch housing 552a. The clutch housing 552a is also configured similar to the clutch housing 452a, so as to fixedly couple to the locking collar 530 and provide a range of travel required by the apply plate 552c and locking mechanism 532.

The locking mechanism 532 generally includes an annular member 534, and a locking actuation mechanism 536. The locking collar 530 may also be considered part of the locking mechanism 532 and/or the housing 532a. The annular member 534 is coupled to the apply plate 532c to transfer torque therebetween and also slides axially relative thereto. The annular member 534 may be considered part of the apply plate 552c. In a first position (e.g., first, forward, or locking position or configuration; see FIGS. 7A and 7C), the annular member 534 is received within the locking collar 530 to form a splined connection therewith (e.g., a locking position). In this forward position, the locking mechanism 532 (e.g., annular member 534) positively couples the primary output shaft 506 to the secondary output shaft 508 to transfer torque therebetween. The annular member 534 and the locking collar 530 may be cooperatively configured to form the splined connection in substantially the same manners as the apply plate 452c and the locking collar 430 (e.g., having complementary diameters and spline patterns). In a second position (e.g., second, rearward, or friction position; See FIGS. 7B and 7D), the annular member 534 is biased rearward to axially engage the apply plate 532c to compress interleaved plates 532b to frictionally couple the primary output shaft 506 to the secondary output shaft 508. In a third position (e.g., third, intermediate, or disengaged position or configuration; see FIG. 7E), the annular member 534 is biased rearward and out of engagement with the locking collar 530 (e.g., an unlocked position), while also not biasing the apply plate 532c sufficiently rearward to form the friction coupling, thereby allowing the primary output shaft 506 to rotate independent of the secondary output shaft 508.

The annular member 534 is coupled to the apply plate with a plurality of pins 534a that are fixedly coupled to the annular member 534 at circumferentially spaced locations that are radially inward of an outer periphery of the annular member 534. The pins 534a are received and slide axially within apertures 552n in a forward surface or entirely through the apply plate 552c, thereby allowing the annular member 534 to move relative to the apply plate 552c between the forward and rearward positions. Alternatively, the pins 534a may be fixedly coupled to the forward surface of the apply plate 552c and slidably received in apertures or recesses of the annular member 534.

A spring 534b (e.g., a coil spring) is configured to normally bias the annular member 534 forward away from the apply plate 552c. The spring 534b is compressed axially between a rearward surface 534c (e.g., a flange) of the annular member 534 and a forward surface of the apply plate 552c. The spring 534b may, for example be positioned radially inward of the pins 534a. Another spring (refer to spring 432m) may bias the apply plate 552d away from the interleaved plates 532b.

The locking actuation mechanism 536, in conjunction with the actuation system 561, is configured to move the annular member 534 rearward from the forward position to the intermediate position and, in conjunction with the spring 534b, allow the annular member 534 to return back to the forward position. The locking actuation mechanism 536 is configured as a face cam mechanism (e.g., is a face cam, such as a ball-ramp mechanism). More particularly, the locking actuation mechanism 536 includes a forward member 536a (e.g., ring) and a rearward member 536b (e.g., ring), wherein relative rotation therebetween causes relative axial displacement therebetween. The forward member 536a is coupled to and rotates with the drive gear assembly 590, for example, by being press fit or splined to an outer periphery thereof. The rearward member 536b is held rotationally in place relative to the housing 502 but may slide relative thereto. For example, the rearward member 536b includes a slot (not labeled), while the housing 502 includes a downwardly protruding boss or projection 502a that is received within the slot of the rearward member 536b. The projection 502a extends substantially parallel with the primary output shaft 506 and has a generally constant cross-section, thereby allowing the rearward member 536b to slide therealong while tangentially engaging the rearward member 536b to prevent rotation within the housing 502. A bearing 536c (e.g., a roller bearing) is positioned between the rearward member 536b and the annular member 534, which transfers force axially between the rearward member 536b and the annular member 534 while allowing the annular member 534 to rotate freely of the rearward member 536b.

The actuator system 561 is configured to move the annular member 534 in staged rotation similar to the actuator system 461 to form the positive coupling and the friction coupling. The actuation system 561 moves the annular member 534 axially into the locked, disengaged, and friction positions (e.g., configurations) as the actuation system 561 (e.g., the drive gear assembly 590) is rotated in the different stages. Additional stages of rotation of the actuation system 561 may also allow for operation of the gear reduction actuation system 580 to select different drive ratios of the transfer case 500. In one example, when the annular member 534 is in the intermediate position, the actuation system 561 is rotated in a first direction to first operate the gear reduction actuator mechanism 580 (i.e., for selecting one of the high or low drive ratios) and rotated in the same direction further to subsequently operate the secondary torque actuator mechanism 570 (e.g., to move the annular member 534 to the locking position or to the friction position to positively or frictionally couple the primary output shaft 506 to the secondary output shaft 508). Rotation in a second direction selects the other of the high or low drive ratios and then selects the other of the locking position or the friction position.

In another example, during a first stage of rotation (i.e., first positive stage and first negative stage), the actuator system 561 is rotated to operate the gear reduction actuation mechanism 580 to select a drive ratio with the gear reduction mechanism 510. During this first stage of rotation, the locking actuation mechanism 536 does not move the annular member 534, such that the annular member 534 remains engaged with the locking collar 530. The annular member 534 and the locking collar 530 thereby positively couple the primary output shaft 506 to the secondary output shaft 508 to transfer torque therebetween. For example, the locking actuation mechanism 536 may have a dwell region associated with this first stage of rotation.

During a second stage of rotation, the actuator system 561 causes the locking actuation mechanism 536 to move the annular member 534 rearward and out of engagement with the locking ring. The locking actuation mechanism 536 includes an advance movement region corresponding to this first stage of rotation. For example, one or both of the forward member 536a and the rearward member 536b having a helically ramped surface corresponding to the second stage of rotation.

During a third stage of rotation, the actuator system 561 causes the secondary torque actuation mechanism 570 to bias the apply plate 552c rearward to compress the interleaved plates 552b to form a friction coupling in the manner described previously (refer to discussion of clutch 352). This friction coupling ultimately transfers torque from the primary output shaft 506 to the secondary output shaft 508. During this third stage of rotation, the apply plate 552c may move axially rearward away from the annular member 534, for example, if the locking actuation mechanism 536 has a dwell region associated with the third stage of rotation that allows the annular member 534 to remain stationary. Alternatively, the annular member 534 may move with the apply plate 552c if the locking actuation mechanism 536 includes an advance movement region associated with the third stage of rotation. The locking actuation mechanism 536 may be configured to provide a friction coupling in only one of the high or low drive ratios, such that the third stage of rotation only occurs in one of the positive or negative directions of rotation.

According to other embodiments, the locking mechanism 532 may be configured in other manners. For example, a separate actuator and/or different mechanism (i.e., other than the actuation system 561 and actuation mechanism 536) may be provided for moving the annular member 534 between the forward and rearward positions.

To return the annular member 534 back to the forward position, the drive gear assembly 590 is rotated in the reverse direction, thereby allowing the spring 534b to decompress and move the annular member 534 to reform the splined connection with the locking collar 530.

While the disclosure has been made in connection with what is presently considered to be the most practical and preferred embodiment, it should be understood that the disclosure is intended to cover various modifications and equivalent arrangements.

What is claimed is:

1. A transfer case comprising:
   a primary output shaft;
   a secondary output shaft; and
   a clutch for selectively transferring torque between the primary shaft and the secondary output shaft, the clutch comprising:
      an apply plate coupled to the primary output shaft to rotate therewith;
      a housing coupled to the secondary shaft to rotate therewith; and
      interleaved plates that are alternatingly coupled to the primary shaft and the housing to rotate therewith;
   wherein the apply plate selectively positively couples to the housing to form a positive coupling between the primary output shaft and the secondary output shaft to transfer torque therebetween, and the apply plate selectively compresses the interleaved plates to form a friction coupling between the primary output shaft and the secondary output shaft to transfer torque therebetween.

2. The transfer case according to claim 1, wherein the positive coupling is formed with the apply plate in a first configuration, the friction coupling is formed with the apply plate in a second configuration, and the positive coupling and the friction coupling are not formed when the apply plate is in a third configuration.

3. The transfer case according to claim 2, wherein the apply plate is in a first position in the first configuration, is in a second position in the second configuration, and is in a third position in the third configuration, the third position being axially between the first position and the second position.

4. The transfer case according to claim 3, wherein a spring presses the apply plate axially away from the interleaved plates.

5. The transfer case according to claim 2, wherein the apply plate includes an annular member coupled thereto that slides axially relative thereto, wherein the annular member is in a first position in the first configuration, is in a second position in the second configuration, and is in a third position in the third configuration, the third position being axially between the first position and the second position.

6. The transfer case according to claim 5, wherein in the second position, the annular member axially engages the apply plate to compress the interleaved plates to form the friction coupling.

7. The transfer case according to claim 6, wherein a spring is compressed axially between the apply plate and the annular member and biases the annular member away from the apply plate.

8. The transfer case according to claim 1, wherein the housing includes a collar coupled thereto, and wherein the apply plate selectively positively couples to the collar to form the positive coupling.

9. The transfer case according to claim 8, wherein the housing is annular with an inner periphery, and the collar protrudes radially inward from the inner periphery of the housing.

10. The transfer case according to claim 8, wherein the apply plate selectively forms a splined connection with the collar to positively couple the apply plate to the collar.

11. The transfer case according to claim 10, wherein the collar has an inner periphery, and the apply plate has an outer periphery that is complementary to the inner periphery of the collar to selectively form the splined connection.

12. The transfer case according to claim 1, further comprising an actuation system having different stages of rotation to form the positive coupling and to form the friction coupling.

13. The transfer case according to claim 12, wherein the actuation system includes additional stages of rotation for selecting different drive ratios of the transfer case.

14. The transfer case according to claim 1, further comprising an actuation system having different stages of rotation to form the positive coupling and to form the friction coupling;
   wherein the positive coupling is formed with the apply plate in a first configuration, the friction coupling is formed with the apply plate in a second configuration, and the positive coupling and the friction coupling are not formed when the apply plate is in a third configuration;
   wherein the housing includes a collar coupled thereto, and the apply plate selectively positively couples to the collar to form the positive coupling in the first configuration;
   wherein the housing is annular with an inner housing periphery, and the collar protrudes radially inward from the inner housing periphery of the housing;

wherein the apply plate selectively forms a splined connection with the collar to positively couple the apply plate to the collar; and wherein the collar has an inner collar periphery, and the apply plate has an outer periphery that is complementary to the inner collar periphery to selectively form the splined connection.

15. A clutch for selectively transferring torque between a primary shaft and a secondary shaft of a transfer case, the clutch comprising:
   an apply plate;
   a housing; and
   interleaved plates;
   wherein the apply plate is selectively coupleable to the housing to positively couple the primary shaft to the secondary shaft to transfer torque therebetween, and selectively compresses the interleaved plates to frictionally couple the primary shaft to the secondary shaft.

16. The clutch according to claim 15, wherein the housing includes a collar that is selectively engageable by the apply plate to positively couple the apply plate to the housing.

17. The clutch according to claim 16, wherein the apply plate is engaged with the collar in a first configuration, is disengaged with the apply plate in a second configuration in which the primary shaft and the secondary shaft are frictionally coupled and is disengaged with the apply plate in a third configuration in which the primary shaft and the secondary shaft are not frictionally coupled.

18. The clutch according to claim 17, wherein the apply plate is in a first position in the first configuration, in a second position in the second configuration, and in a third position in the third configuration, the third position being axially between the first position and the second position.

19. The clutch according to claim 17, wherein the apply plate further includes an annular member that engages the collar, and wherein the annular member is in a first position in the first configuration, in a second position in the second configuration, and in a third position in the third configuration, the third position being axially between the first position and the second position.

* * * * *